US011968015B2

(12) United States Patent
Wei et al.

(10) Patent No.: US 11,968,015 B2
(45) Date of Patent: Apr. 23, 2024

(54) PROCESSING ENHANCEMENTS FOR CHANNEL STATE INFORMATION REPORTING

(71) Applicant: Qualcomm Incorporated, San Diego, CA (US)

(72) Inventors: Chao Wei, Beijing (CN); Chenxi Hao, Beijing (CN); Yu Zhang, San Diego, CA (US); Qiaoyu Li, Beijing (CN); Peter Pui Lok Ang, San Diego, CA (US); Jing Lei, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 132 days.

(21) Appl. No.: 17/639,321

(22) PCT Filed: Aug. 30, 2019

(86) PCT No.: PCT/CN2019/103574
§ 371 (c)(1),
(2) Date: Feb. 28, 2022

(87) PCT Pub. No.: WO2021/035666
PCT Pub. Date: Mar. 4, 2021

(65) Prior Publication Data
US 2022/0321189 A1  Oct. 6, 2022

(51) Int. Cl.
*H04B 7/06* (2006.01)
*H04L 5/00* (2006.01)

(52) U.S. Cl.
CPC ......... *H04B 7/0628* (2013.01); *H04B 7/0632* (2013.01); *H04B 7/0639* (2013.01); *H04L 5/0057* (2013.01)

(58) Field of Classification Search
CPC .. H04B 7/0628; H04B 7/0632; H04B 7/0639; H04L 5/0057
See application file for complete search history.

(56) References Cited

U.S. PATENT DOCUMENTS

2012/0127899 A1  5/2012  Ketchum et al.
2019/0207737 A1  7/2019  Babaei et al.
(Continued)

FOREIGN PATENT DOCUMENTS

CN   107113045 A    8/2017
EP   2804425 A1    11/2014
(Continued)

OTHER PUBLICATIONS

International Search Report and Written Opinion—PCT/CN2019/103574—ISA/EPO—dated May 29, 2020.
(Continued)

*Primary Examiner* — Janice N Tieu
(74) *Attorney, Agent, or Firm* — QUALCOMM Incorporated

(57) ABSTRACT

A user equipment (UE) may report capabilities pertaining to UE feedback processing, such as a number of simultaneous feedback reports that can be processed and reported by the UE for various types of feedback. For example, UE feedback processing capability may depend on channel state information (CSI) processing units (CPUs) available to the UE for feedback processing operations (e. g., for performing channel measurements, processing feedback, generating a feedback report, etc.). A UE may report feedback processing capability separately for periodic feedback reporting and for aperiodic feedback reporting, for different types of feedback reporting (e. g., for CSI reporting, for beam management reporting, etc.), etc. As such, a UE may more efficiently report capabilities pertaining to UE feedback processing, and a base station may more efficiently configure UE feedback reporting according to UE feedback processing capability.

24 Claims, 20 Drawing Sheets

(56) References Cited

U.S. PATENT DOCUMENTS

| | | | | |
|---|---|---|---|---|
| 2019/0215136 | A1* | 7/2019 | Zhou | H04L 1/1819 |
| 2019/0319688 | A1* | 10/2019 | Sun | H04B 7/088 |
| 2020/0163074 | A1* | 5/2020 | Tang | H04W 72/23 |
| 2021/0409900 | A1* | 12/2021 | Wang | H04W 48/16 |
| 2022/0022193 | A1* | 1/2022 | Zhang | H04W 72/23 |

FOREIGN PATENT DOCUMENTS

| | | |
|---|---|---|
| EP | 3240202 A1 | 11/2017 |
| WO | WO-2017146764 A1 | 8/2017 |
| WO | WO-2018204571 A1 | 11/2018 |

OTHER PUBLICATIONS

Nokia, et al., "On Beam Grouping and Reporting", 3GPP TSG-RAN WG1 Meeting #88bis, 3GPP Draft, R1-1705959, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Apr. 3, 2017-Apr. 7, 2017, Apr. 2, 2017 (Apr. 2, 2017), 12 Pages, XP051244068, Retrieved from the Internet: URL: http://www.3gpp.org/ftp/Meetings_3GPP_SYNC/RAN1/Docs/ [retrieved on Apr. 2, 2017] p. 1-p. 3, Figure 1 p. 8.

Huawei., et al., "UE Processing Aspects of CSI Feedback", R1-124072, 3GPP TSG RAN WG1 Meeting #70bis, 3rd Generation Partnership Project (3GPP), Mobile Competence Centre, 650, Route Des Lucioles, F-06921 Sophia-Antipolis Cedex, France, San Diego, USA, Oct. 8-12, 2012, XP050661982, 5 Pages, paragraph 4.

Interdigital., et al., "Remaining Details on CSI Reporting", 3GPP TSG RAN WG1 Meeting #93, R1-1807013, 3rd Generation Partnership Project, Mobile Competence Centre, 650, Route Des Lucioles, F-06921 Sophia-Antipolis Cedex, France, RAN WG1, No. Busan, Korea, May 21, 2018-May 25, 2018, May 20, 2018, pp. 1-3, XP051442211, paragraph 1, paragraph 2.

Supplementary European Search Report—EP19943498—Search Authority—Munich—dated Apr. 24, 2023.

* cited by examiner

PROCESSING ENHANCEMENTS FOR CHANNEL STATE INFORMATION REPORTING

CROSS REFERENCE

The present application is a 371 national stage filing of International PCT Application No. PCT/CN2019/103574 by Wei et al., entitled "PROCESSING ENHANCEMENTS FOR CHANNEL STATE INFORMATION REPORTING," filed Aug. 30, 2019, which is assigned to the assignee hereof, and which is expressly incorporated by reference in its entirety herein.

BACKGROUND

The following relates generally to wireless communications, and more specifically to processing enhancements for channel state information (CSI) reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, a base station may utilize feedback from a UE to coherently configure a communications link between the base station and the UE. For example, a UE may send channel information to the base station using a CSI report, which may be sent periodically or triggered as needed by the base station. The CSI report may provide information associated with channel conditions for a transmission received at the UE over some time duration (e.g., over a transmission time interval (TTI)). However, in some cases, conventional feedback techniques (e.g., feedback configuration by a base station, UE feedback reporting, etc.) may be deficient.

SUMMARY

The described techniques relate to improved methods, systems, devices, and apparatuses that support processing enhancements for channel state information (CSI) reporting. Generally, the described techniques provide for UE feedback configuration and UE feedback reporting in accordance with varying UE feedback processing capabilities. For example, aspects of the techniques described herein may provide for improved feedback processing capability reporting by a UE, as well as enhanced UE feedback processing techniques.

A UE may report capabilities pertaining to UE feedback processing, such as a number of simultaneous feedback reports that can be processed and reported by the UE for various types of feedback. For example, UE feedback processing capability may depend on CSI processing units (CPUs) available to the UE for feedback processing operations (e.g., for performing channel measurements, processing feedback, generating a feedback report, etc.). In some scenarios, a UE may be capable of simultaneously performing some number of feedback process operations (e.g., CSI calculations). In some cases, the number of CPUs may be equal to the number of CSI calculations that the UE is capable of simultaneously processing. Further, UE feedback processing capability may depend on the type of feedback reporting (e.g., CSI reporting, beam management reporting, etc.), whether the feedback reporting is periodic or aperiodic, etc. As such, according to the techniques described herein, a UE may more efficiently report capabilities pertaining to UE feedback processing, and a base station may more efficiently configure UE feedback reporting according to UE feedback processing capability. Some aspects of the described techniques may also provide for enhanced UE feedback processing techniques (e.g., in scenarios where there are not enough CPUs available for the UE to simultaneously perform CSI calculations on each CSI reference signal (CSI-RS) the UE is configured to report).

A method of wireless communication is described. The method may include transmitting a feedback reporting capability including a first feedback processing capability and a second feedback processing capability and performing a set of feedback processing operations according to the first and second feedback processing capabilities, the set of feedback processing operations including at least one processing operation associated with a channel state information report and at least one processing operation associated with a beam report. The method may further include transmitting a set of feedback reports including the channel state information report and the beam report.

An apparatus for wireless communication is described. The apparatus may include a processor, memory coupled with the processor, and instructions stored in the memory. The instructions may be executable by the processor to cause the apparatus to transmit a feedback reporting capability including a first feedback processing capability and a second feedback processing capability and perform a set of feedback processing operations according to the first and second feedback processing capabilities, the set of feedback processing operations including at least one processing operation associated with a channel state information report and at least one processing operation associated with a beam report. The instructions may be executable by the processor to further cause the apparatus to transmit a set of feedback reports including the channel state information report and the beam report.

Another apparatus for wireless communication is described. The apparatus may include means for transmitting a feedback reporting capability including a first feedback processing capability and a second feedback processing capability and means for performing a set of feedback processing operations according to the first and second feedback processing capabilities, the set of feedback processing operations including at least one processing operation associated with a channel state information report and at least one processing operation associated with a beam report. The apparatus may further include means for transmitting a set of feedback reports including the channel state information report and the beam report.

A non-transitory computer-readable medium storing code for wireless communication is described. The code may include instructions executable by a processor to transmit a feedback reporting capability including a first feedback processing capability and a second feedback processing capability and perform a set of feedback processing operations according to the first and second feedback processing capabilities, the set of feedback processing operations including at least one processing operation associated with a channel state information report and at least one processing operation associated with a beam report. The code may include instructions further executable by a processor to transmit a set of feedback reports including the channel state information report and the beam report.

Some examples of the method, apparatuses, and non-transitory computer-readable medium described herein may further include operations, features, means, or instructions for receiving a first set of feedback reporting configurations associated with the first type of feedback reporting, and performing feedback processing operations for the first set of feedback reporting configurations according to the first feedback processing capability. Some examples of the method, apparatuses, and non-transitory computer-readable medium described herein may further include operations, features, means, or instructions for determining a processing conflict between two or more of the feedback processing operations associated with the first set of feedback reporting configurations, and suppressing at least one of the two or more of the feedback processing operations based on the determined processing conflict and at least one of priorities or timing of the two or more of the feedback processing operations.

Some examples of the method, apparatuses, and non-transitory computer-readable medium described herein may further include operations, features, means, or instructions for receiving a second set of feedback reporting configurations associated with the second type of feedback reporting, and performing feedback processing operations for the second set of feedback reporting configurations according to the second feedback processing capability and independently of the first feedback processing capability. In some examples of the method, apparatuses, and non-transitory computer-readable medium described herein, the first type of feedback corresponds to one of periodic or aperiodic feedback reporting and the second type of feedback corresponds to the other of periodic or aperiodic feedback reporting. In some examples of the method, apparatuses, and non-transitory computer-readable medium described herein, the first type of feedback corresponds to channel state information reporting and the second type of feedback corresponds to beam reporting.

A method of wireless communication is described. The method may include receiving a feedback reporting configuration including a set of parameter sets corresponding to a set of reporting granularities and receiving an indication of a triggering state for feedback reporting. The method may further include selecting one of the set of parameter sets based on the received indication of the triggering state and transmitting a feedback report associated with the feedback reporting configuration based on the selecting.

An apparatus for wireless communication is described. The apparatus may include a processor, memory coupled with the processor, and instructions stored in the memory. The instructions may be executable by the processor to cause the apparatus to receive a feedback reporting configuration including a set of parameter sets corresponding to a set of reporting granularities, receive an indication of a triggering state for feedback reporting, select one of the set of parameter sets based on the received indication of the triggering state, and transmit a feedback report associated with the feedback reporting configuration based on the selecting.

Another apparatus for wireless communication is described. The apparatus may include means for receiving a feedback reporting configuration including a set of parameter sets corresponding to a set of reporting granularities, receiving an indication of a triggering state for feedback reporting, selecting one of the set of parameter sets based on the received indication of the triggering state, and transmitting a feedback report associated with the feedback reporting configuration based on the selecting.

A non-transitory computer-readable medium storing code for wireless communication is described. The code may include instructions executable by a processor to receive a feedback reporting configuration including a set of parameter sets corresponding to a set of reporting granularities, receive an indication of a triggering state for feedback reporting, select one of the set of parameter sets based on the received indication of the triggering state, and transmit a feedback report associated with the feedback reporting configuration based on the selecting.

In some examples of the method, apparatuses, and non-transitory computer-readable medium described herein, each of the set of parameter sets may be associated with one of wideband or subband channel quality indicator (CQI) reporting and one of wideband or subband precoding matrix indicator (PMI) reporting. In some examples of the method, apparatuses, and non-transitory computer-readable medium described herein, each of the set of parameter sets may be associated with one of a first codebook type or a second codebook type. In some examples of the method, apparatuses, and non-transitory computer-readable medium described herein, the indication of the triggering state may be received in a downlink control channel. In some examples of the method, apparatuses, and non-transitory computer-readable medium described herein, the indication of the triggering state may be received in a medium access control (MAC) control element (CE).

A method of wireless communication is described. The method may include receiving, from a UE, a feedback reporting capability including a first feedback processing capability and a second feedback processing capability, configuring the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receiving, from the UE, a set of feedback reports associated with the set of feedback configurations.

An apparatus for wireless communication is described. The apparatus may include a processor, memory coupled with the processor, and instructions stored in the memory. The instructions may be executable by the processor to cause the apparatus to receive, from a UE, a feedback reporting capability including a first feedback processing capability and a second feedback processing capability, configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receive, from the UE, a set of feedback reports associated with the set of feedback configurations.

Another apparatus for wireless communication is described. The apparatus may include means for receiving, from a UE, a feedback reporting capability including a first feedback processing capability and a second feedback processing capability, configuring the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receiving, from the UE, a set of feedback reports associated with the set of feedback configurations.

A non-transitory computer-readable medium storing code for wireless communication is described. The code may include instructions executable by a processor to receive, from a UE, a feedback reporting capability including a first feedback processing capability and a second feedback processing capability, configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receive, from the UE, a set of feedback reports associated with the set of feedback configurations.

In some examples of the method, apparatuses, and non-transitory computer-readable medium described herein, the first feedback processing capability corresponds to a periodic feedback processing capability and the second feedback processing capability corresponds to an aperiodic feedback processing capability. Some examples of the method, apparatuses, and non-transitory computer-readable medium described herein may further include operations, features, means, or instructions for configuring periodicities and offsets for a set of periodic feedback processes for the UE such that processing associated with the set of periodic feedback processes does not exceed the periodic feedback processing capability. Some examples of the method, apparatuses, and non-transitory computer-readable medium described herein may further include operations, features, means, or instructions for transmitting, to the UE, a first trigger for a first aperiodic reporting process, and transmitting, to the UE, a second trigger for a second aperiodic reporting process, where transmitting the second trigger may be based on a processing time for the first aperiodic reporting process and the aperiodic feedback processing capability.

In some examples of the method, apparatuses, and non-transitory computer-readable medium described herein, the first feedback processing capability corresponds to a processing capability associated with a first type of feedback and the second feedback processing capability corresponds to a processing capability associated with a second type of feedback. In some examples of the method, apparatuses, and non-transitory computer-readable medium described herein, the first type of feedback corresponds to channel state information reporting and the second type of feedback corresponds to beam reporting. Some examples of the method, apparatuses, and non-transitory computer-readable medium described herein may further include operations, features, means, or instructions for configuring parameters for a set of beam reporting feedback processes for the UE such that processing associated with the set of beam reporting feedback processes does not exceed the processing capability associated with beam reporting.

DETAILED DESCRIPTION

Figure 1:
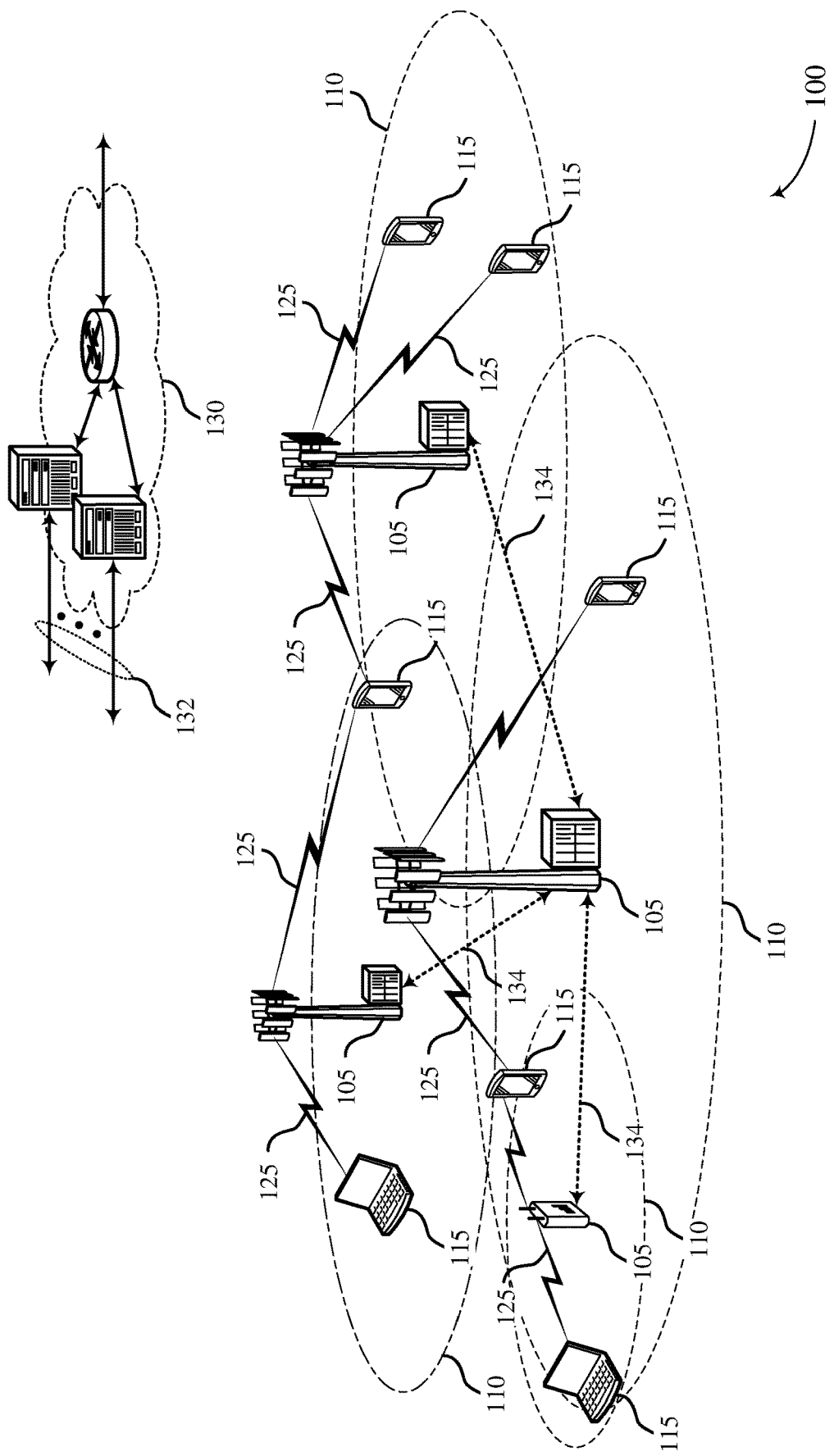
FIG. 1 illustrates an example of a system for wireless communications that supports processing enhancements for CSI reporting in accordance with aspects of the present disclosure.

In wireless communications systems, feedback reporting (e.g., channel state information (CSI), beam feedback) by a user equipment (UE) may provide information regarding a communications link between the UE and a base station. For example, CSI may include information determined by a UE associated with reception of signals over the communications link (e.g., a rank indicator (RI), a precoding matrix indicator (PMI), a channel quality indicator (CQI), etc.). In some cases, a UE may transmit CSI reports to a base station to provide information required for subsequent scheduling and transmissions. Feedback reporting may be periodic or aperiodic (e.g., triggered by signaling from a base station). For example, a UE may receive signaling from a base station configuring periodic feedback reports (e.g., periodic CSI (P-CSI) for beam reporting, P-CSI for CSI reporting, etc.) and/or a UE may receive a trigger (e.g., a CSI trigger) from a base station for an aperiodic feedback report (e.g., aperiodic CSI (A-CSI)). In some cases, a channel state information reference signal (CSI-RS) may be used (e.g., processed) by a UE to estimate channel quality between a base station and UE, and the UE may transmit a CSI report to the base station indicating the channel quality information.

UE feedback processing capability may depend on CSI processing units (CPUs) available to the UE for feedback processing operations (e.g., for performing channel measurements, processing CSI for feedback, generating a feedback report, etc.). CPUs may refer, for example, to virtual or physical resources of a processor (e.g., having one or more cores) corresponding to the operations for feedback processing. In some scenarios, a UE may be capable of simultaneously performing some number of feedback process operations (e.g., CSI calculations). For example, in some cases, the number of CPUs may be equal to the number of CSI calculations that the UE is capable of simultaneously processing. Further, UE feedback processing capability may depend on the type of feedback reporting (e.g., CSI reporting, beam management reporting, etc.), whether the feedback reporting is periodic or aperiodic, etc. As such, a UE may be limited in feedback processing capability (e.g., in how the UE distributes processing capabilities, or CPUs, across feedback processing operations such as CSI calculations, feedback report generation, etc.).

In some cases, a UE may be configured for feedback reporting (e.g., for several feedback processing operations) that exceeds the UE feedback processing capability. In such cases, a UE may be unable to update the base station with CSI, beam management information, etc. In such cases, CSI and beam management information may become outdated and/or inaccurate, and data transmission scheduled by the base station based on the outdated CSI report may not be successful, beam management operations may not successfully be performed (e.g., beam failure may result), etc.

According to the techniques described herein, a UE may more efficiently report capabilities pertaining to UE feedback processing, and a base station may more efficiently configure UE feedback reporting according to such UE feedback processing capabilities. In some aspects, a UE may separately report a maximum number of concurrently supported CSI reports for periodic CSI reporting and aperiodic CSI reporting. In some aspects, a UE may separately report a maximum number of simultaneous supported CSI reports for different CSI types. For example, a UE may report a number of CPUs for periodic CSI calculation and a number of CPUs for aperiodic CSI calculation, and a base station may configure P-CSI and trigger A-CSI accordingly. Additionally or alternatively, a UE may separately a number of CPUs for CSI reporting and a number of CPUs for beam reporting.

Some aspects of the described techniques may also provide for enhanced UE feedback processing techniques (e.g., in scenarios where there are not enough CPUs available for the UE to simultaneously perform CSI calculations on each CSI reference signal (CSI-RS) the UE is configured to report). For example, in cases where a UE determines a processing conflict when configured feedback reporting (e.g., the configured number of received CSI requests) exceeds UE feedback processing capability, the UE may perform feedback processing operations based on priorities of the feedback processing operations, based on timing of the feedback processing operations (dropping feedback processing operations triggered later in time), etc.

Additionally, some aspects of the described techniques may provide for improved base station configuration of UE feedback reporting granularity. For example, in some cases, a UE may support only one CSI report setting for CSI reporting per time domain behavior (e.g., a UE may support one CSI reporting configuration, one CSI-RS, one CSI calculation, etc. for a periodic or aperiodic CSI report). In such cases, it may be desirable for a base station to be able to vary the CSI granularity (e.g., for wideband CSI reporting, subband CSI reporting, etc.) without incurring latency and overhead associated with radio resource control (RRC) reconfiguration of the CSI report setting. As such, a base station may dynamically reconfigure CSI granularity via downlink control information (DCI) signaling (e.g., where different CSI triggering states of DCI may configure different CSI granularity for a same CSI report setting) or via medium access control (MAC) control element (CE) signaling (e.g., where a MAC CE may update CSI granularity for a CSI report setting).

Aspects of the disclosure are initially described in the context of a wireless communications system. Example CSI processing techniques and example process flows illustrating aspects of the discussed techniques are then described. Aspects of the disclosure are further illustrated by and described with reference to apparatus diagrams, system diagrams, and flowcharts that relate to processing enhancements for CSI reporting.

FIG. 1 illustrates an example of a wireless communications system 100 that supports processing enhancements for CSI reporting in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), massive machine-type communication (mMTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, UEs 115 may be designed to operate at lower transmit power, in a smaller bandwidth for uplink and downlink communications, with reduced computational complexity, etc. These UEs 115 (e.g., NR-Light, Low-Tier NR UE, etc.) may include smart wearable devices, industrial sensors, video surveillance devices, etc. Accordingly, these UEs 115 may operate using batteries and/or be in continuous operation, such that a reduced transmit power may increase battery life for the UEs 115 and/or provide less drain on power. For example, these UEs 115 may operate at an uplink transmit power lower (e.g., at least 10 dB less) than conventional UEs 115 (e.g., legacy eMBB UEs). Additionally, these UEs 115 may use a reduced transmit/receive bandwidth (e.g., 5 MHz bandwidth) for both transmitting and receiving communications with a base station 105.

A base station 105 may gather channel condition information from a UE 115 in order to efficiently configure or schedule communications. In some cases, this information may be sent from the UE 115 in the form of a feedback report (e.g., in the form of CSI). In some examples, CSI may include a RI requesting a number of layers to be used for downlink transmissions (e.g., based on the antenna ports of the UE 115), a PMI indicating a preference for which precoder matrix should be used (based on the number of layers), and a CQI representing the highest modulation and coding scheme (MCS) that may be used. In some cases, CQI may be calculated by a UE 115 after receiving predetermined pilot symbols, such as a common reference signal (CRS) or CSI-RS. The types of information included in a feedback report may determine a reporting type. Additionally, CSI may be periodic or aperiodic. That is, a base station 105 may configure a UE 115 to send periodic reports at regular intervals, and may also request additional aperiodic reports as needed (e.g., using DCI triggering). Aperiodic reports may include wideband reports indicating the channel quality across an entire cell bandwidth, UE-selected reports indicating a subset of the best sub-bands, or configured reports in which the subbands reported are selected by the base station 105. CSI-RS resources may be measured by a UE 115 to estimate channel quality of a CSI reference resource slot and may be indicated by measured channel quality parameters (e.g., CQI, PMI, RI, layer 1-reference signal received power (L1-RSRP), etc.). The UE 115 may transmit a CSI report to the base station 105 indicating the measured channel quality parameters for the CSI reference resource slot. In some cases, the base station 105 may use the CSI report for scheduling in the future.

As discussed herein, UE 115 feedback processing capability may depend on CPUs available to the UE 115 for feedback processing operations (e.g., for performing channel measurements, processing feedback, generating a feedback report, etc.). In some scenarios, a UE 115 may be capable of simultaneously performing some number of feedback process operations (e.g., CSI calculations). For example, in some cases, the number of CPUs may be equal to the number of CSI calculations that the UE is capable of concurrently processing. Further, UE 115 feedback processing capability may depend on the type of feedback reporting (e.g., CSI reporting, beam management reporting, etc.), whether the feedback reporting is periodic or aperiodic, etc. As such, a UE 115 may be limited in feedback processing capability (e.g., in how the UE 115 distributes processing capabilities, or CPUs, across feedback processing operations such as CSI calculations, feedback report generation, etc.).

In some cases, a UE 115 may be configured for feedback reporting (e.g., for several feedback processing operations) that exceed the feedback processing capability of the UE 115. In such cases, a UE 115 may be unable to update the base station 105 with CSI, beam management information, etc. In such cases, CSI and beam management information may become outdated and/or inaccurate, and data transmission scheduled by a base station 105 based on the outdated CSI report may not be successful, beam management operations may not successfully be performed (e.g., beam failure may result), etc.

To mitigate occurrence of such issues, the capability of the UE 115 may be considered to efficiently utilize resources (e.g., CPUs) of the UE 115 to process feedback reports. According to the techniques described herein, a UE 115 may more efficiently report capabilities pertaining to UE 115 feedback processing, and a base station 105 may more efficiently configure UE 115 feedback reporting according to such UE 115 feedback processing capabilities. In some aspects, a UE 115 may separately report a maximum number of simultaneous supported CSI reports for periodic CSI reporting and aperiodic CSI reporting. For example, a UE 115 may report a number of CPUs for periodic CSI calculation and a number of CPUs for aperiodic CSI calculation, and a base station 105 may configure P-CSI and trigger A-CSI accordingly. In some aspects, a UE 115 may separately report a maximum number of simultaneous supported CSI reports for different CSI types (e.g., a UE 115 may separately a number of CPUs for CSI reporting and a number of CPUs for beam reporting).

Some aspects of the described techniques may also provide for enhanced UE 115 feedback processing techniques (e.g., in scenarios where there are not enough CPUs available for the UE 115 to simultaneously perform CSI calculations on each CSI reference signal (CSI-RS) the UE 115 is configured to report). For example, in cases where a UE 115 determines a processing conflict when configured feedback reporting (e.g., the configured number of received CSI requests) exceeds UE 115 feedback processing capability, the UE 115 may perform feedback processing operations based on priorities of the feedback processing operations, based on timing of the feedback processing operations (e.g., prioritizing feedback processing operations triggered earlier), etc.

As such, according to the techniques described herein, a base station 105 may more efficiently configure UE 115 feedback reporting, may more efficiently balance tradeoffs (e.g., in outdated CSI, outdated beam management information, etc.) in scenarios where a UE 115 is not capable of certain feedback configurations, etc. Further, a UE 115 may more efficiently be configured for feedback reporting. Generally, the described techniques may provide for improved communication scheduling (e.g., due to efficient CSI reporting), improved beam management or reduced beam failures (e.g., due to efficient beam reporting), etc., which may enhance operation of base stations 105 and UEs 115, improve user experience, etc.

Figure 2:
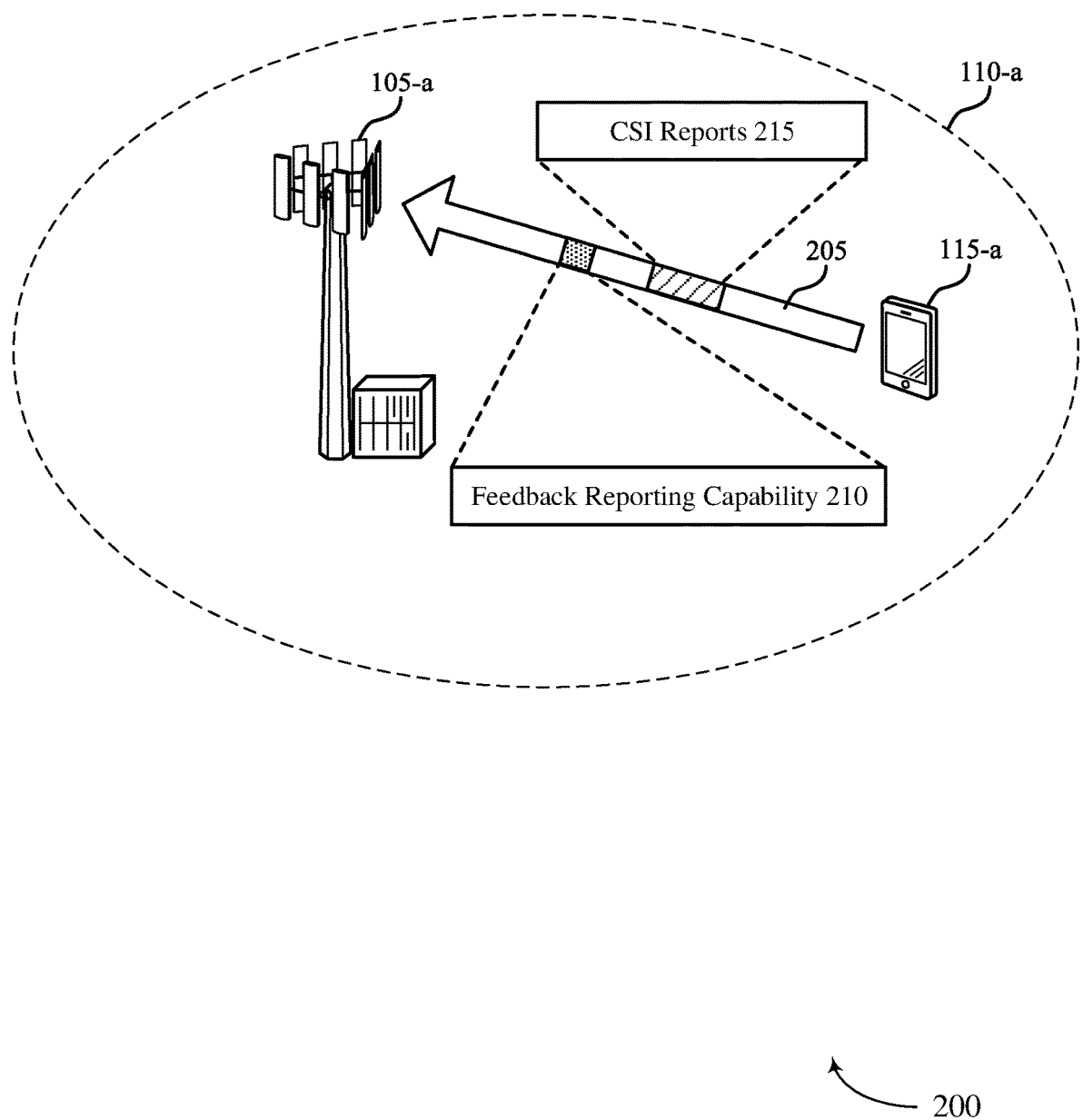
FIG. 2 illustrates an example of a wireless communications system that supports processing enhancements for CSI reporting in accordance with aspects of the present disclosure.

FIG. 2 illustrates an example of a wireless communications system 200 that supports processing enhancements for CSI reporting in accordance with aspects of the present disclosure. In some examples, wireless communications system 200 may implement aspects of wireless communications system 100. Wireless communications system 200 may include a base station 105 a and a UE 115 a, which may be examples of the corresponding devices described with reference to FIG. 1. Base station 105 a may be in communication with one or more UEs 115 within coverage area 110-a. According to the techniques described herein, UE 115-a may transmit feedback reporting capability 210 (e.g., signaling indicating feedback reporting capabilities, a feedback reporting capability report, etc.) to base station 105-a via communication link 205. Base station 105-a may (e.g., with consideration of feedback reporting capability 210) configure UE 115-a to transmit feedback reports (e.g., one or more CSI reports 215).

Base station 105-a may configure UE 115-a with feedback reporting. For example, base station 105-a may send a request to acquire CSI information (e.g., that may be utilized for subsequent scheduling and transmissions). Base station 105-a may accordingly configure (e.g., for P-CSI) or trigger (e.g., for A-CSI) feedback reporting to initiate CSI processing operations or beam reporting processing operations performed by UE 115-a. For example, based on configured feedback reporting, base station 105-a may transmit a CSI-RS within one or more CSI resources for measurement by UE 115-a to estimate channel quality between the base station 105-a and the UE 115-a. The UE 115-a may transmit a CSI report 215 to the base station 105-a indicating the channel quality information that the base station 105-a may use for scheduling subsequent data transmissions.

In some cases (e.g., in NR, for eMBB/ultra-reliable low-latency communication (URLLC)), UE capability signaling for CSI calculation may be complex. For example, a maximum number of configured CSI report settings (e.g., reported separately for P-CSI, A-CSI, and semi-persistent CSI) per bandwidth part (BWP) may be reported per band, and a maximum number of configured CSI-RS resources/CSI-interference measurement (CSI-IM) resources and ports may be reported per band along with the maximum number of simultaneous CSI reports (e.g., number of CPUs for CSI calculation) and simultaneous CSI-RS/CSI-IM resources/ports in a component carrier (CC). Further, supported codebooks may be signaled per band in CodebookParameters. For each codebook type (e.g., Type I Single Panel, Type I Multi-Panel, Type II, Type II port selection), a list of triplets (e.g., maxNumberTxPortsPerResource, maxNumberResourcesPerBand, totalNumberTxPortsPerBand) may be signaled. Further, for a UE supporting inter-band CA, the maximum number of simultaneous CSI report and simultaneous CSI-RS/CSI-IM resources/ports may also reported per band combination. Further yet, a UE may report capability signaling for beam management (e.g., the maximum number of configured CSI report settings, separately for P-CSI, A-CSI, and semi-persistent CSI, per BWP for beam report may be reported per band.

For example, the UE may indicate that it supports:
Type I codebook with 32 ports in a resource, 2 simultaneous resources and max 64 total ports across all CCs in Band #1
Type II codebook with 32 ports in a resource, 1 simultaneous resource and max 32 total ports across all CCs in Band #1
Type I codebook with 8 ports in a resource, 1 simultaneous resource and max 8 total ports across all CCs in Band #2
At most 2 simultaneous CSI reports in a CC including the beam report and CSI report when CA is not configured
At most 5 simultaneous CSI reports in a band combination consisting of (Band #1, Band #2)

In some examples, such a structure for UE capability signaling may lead the UE to underreport its capability for simultaneous resources/ports associated with a codebook type within a band when the UE is triggered with a CSI report with mixes of codebook types (e.g., for the example capability signaling above), the UE may underreport its capability for Type II codebook since the UE may be triggered with simultaneous Type I and Type II reports on Band #1).

Further, in some cases, the total number of configured CSI report settings per BWP for P-CSI, A-CSI, and semi-persistent CSI report may be larger than the number of simultaneous CSI reports that a UE indicates for a CC (e.g., the UE may indicate its support for 1 periodic CSI report setting for CSI report, 1 periodic CSI report setting for beam report and 1 aperiodic CSI report setting for CSI report but at most 2 simultaneous CSI reports (i.e. using 2 CPUs for CSI calculation) for CSI report and beam report).

In such cases, the $N_{cpu}$ CSI processing units of the UE may be dynamically shared among all the configured CSI report settings as follows. If L CPUs are occupied in a given OFDM symbol and the N CSI reports start occupying their respective CPUs on the same OFDM symbol with each CSI report n=0, . . . , N−1 may correspond to $O_{cpu}^{(n)}$, where $O_{cpu}^{(n)}$ is the number of CPUs used to the $n^{th}$ CSI report, the UE may updated only the M requested CSI reports out of the N CSI reports with highest priority where 0≤M≤N is the largest value such that $\Sigma_{n=0}^{M-1} O_{cpu}^{(n)} \leq N_{cpu}-L$ holds. Processing of a CSI report may occupy a number of symbols. For example, a periodic CSI report may occupy a CPU from the first symbol of the CSI-RS resource until the last symbol of the PUSCH/PUCCH carrying the report and an aperiodic CSI report may occupy a CPU from the first symbol after the PDCCH triggering the CSI report until the last symbol of the PUSCH carrying the report.

For example, in scenarios where a UE is capable of three CSI report settings and 2 CPUs, since A-CSI report may be triggered by the PDCCH, the UE may dynamically reconfigure the CPU for processing CSI report (e.g., thus adding complexity for UE implementation and also increasing CSI computation time for which the time for CPU reconfiguration and initialization may also be included). Furthermore, when all the CPUs are occupied at the CSI report instance, it may not possible for UE to timely update the important CSI report (e.g., a beam report). In other words, in cases where a UE is capable of three CSI report settings and 2 CPUs, in some cases the base station may configure feedback reporting over the three CSI report settings (e.g., the base station may configure P-CSI for CSI report, P-CSI for beam report, and A-CSI for CSI report) and the UE may be unable to update (e.g., report) some feedback (e.g., in cases where three processing operations overlap, as the UE is only capable of processing the equivalent of two CPUs).

In some cases, wireless communications system 200 may implement eMBB, URLLC, mMTC, etc. For example, mMTC may be associated with novel IoT use cases targeted in vertical industries (e.g., industrial sensors, cameras, wearables, etc.). Such user cases may motivate introduction of such feedback solutions (e.g., NR-based solutions described above), however some devices (e.g., mMTC devices) may be associated with low end UE capabilities (e.g., compared to eMBB devices or URLLC devices). For example, a UE 115-a may be designed to operate at lower transmit power, in a smaller bandwidth for uplink and downlink communications, with reduced computational complexity, etc. UE 115-a (e.g., NR-Light, Low-Tier NR UE, mMTC UE, etc.) may represent or be an example of smart wearable devices, industrial sensors, video surveillance devices, etc. For example, UE 115-a may operate with a reduced number of antennas for smaller UE form factor (e.g., one transmit, two receive (1T2R) or one transmit, one receive (1T1R)), may use a reduced transmit/receive bandwidth compared to eMBB/URLLC UEs (e.g., such as a 5 MHz bandwidth), may operate in an ultra-low UE power class for battery saving (e.g., such as 18 dBm peak power compared to 26 dBm), etc. Further, UE 115-a may provide for, or support, efficient coexistence with existing eMBB/URLLC since low-tier NR-Light UEs (e.g., UE 115-a) and high-end eMBB/URLLC UEs 115 may be deployed in the same cell and the same band.

As such, according to one or more aspects, the described techniques may provide for a low cost and low complexity CSI reporting framework (e.g., feedback reporting framework) for NR-Light, for industrial sensors and wearables IoT, etc. UE 115-a may report capabilities pertaining to UE 115-a feedback processing, such as a number of simultaneous feedback reports that can be processed and reported by the UE 115-a for various types of feedback. For example, UE 115-a feedback processing capability may depend on CPUs available to the UE 115-a for feedback processing operations (e.g., for taking channel measurement, processing feedback, generating a feedback report, etc.). In some scenarios, a UE 115-a may be capable of simultaneously performing some number of feedback processing operations (e.g., CSI calculations). In some cases, the number of CPUs may be equal to the number of CSI calculations that the UE 115-a is capable of simultaneous processing. Further, UE 115-a feedback processing capability may depend on the type of feedback reporting (e.g., CSI reporting, beam management reporting, whether the feedback reporting is periodic or aperiodic, etc). As such, according to the techniques described herein, a UE 115-a may more efficiently report capabilities pertaining to UE 115-a feedback processing, and a base station may more efficiently configure UE 115-a feedback reporting according to such UE 115-a feedback processing capabilities. Some aspects of the described techniques may also provide for enhanced UE 115-a feedback processing techniques (e.g., in scenarios where there are not enough CPUs available for the UE 115-a to simultaneously perform CSI calculations on each CSI-RS the UE 115-a is configured to report).

For example, one or more aspects of the described techniques may provide for relaxation on the supported number of simultaneous CSI reports. To trade-off between complexity and flexibility for dynamic sharing of CPUs, UE 115-a may indicate (e.g., via feedback reporting capability 210) maximum concurrent CSI reports separately for different CSI types. For example, UE 115-a may indicate maximum concurrent CSI reports separately for periodic CSI reporting and aperiodic CSI reporting. In some cases, feedback reporting capability 210 may include a value of a number of CPUs supported for periodic CSI calculation and a value of a number of CPUs supported for aperiodic CSI calculation. Additionally or alternatively, feedback reporting capability 210 may include a value (e.g., number) of simultaneous CSI reports (e.g., a value of CPUs) supported for CSI reporting and a value of simultaneous CSI reports (e.g., a value of CPUs) supported for beam reporting.

In cases where UE 115-a indicates maximum simultaneous CSI reports separately for periodic CSI reporting and aperiodic CSI reporting, since CPUs are not shared across periodic and aperiodic CSI reporting, base station 105-a may configure different reporting periodicity and slot offset for multiple P-CSI reports that orthogonally share the same CPU to avoid the case of CSI not being updated due to occupation of processing resources. In cases where UE 115-a indicates maximum concurrent CSI reports separately for CSI reporting and beam reporting, since beam reporting is assigned with a CPU different from that of CSI reporting, the beam update report may be timely sent to the base station 105-a with no delay. For example, when the same CSI-RS resource and codebook parameter are configured for P-CSI and A-CSI report but with different CSI granularity (e.g., wideband CQI/PMI or subband CQI/PMI), dynamic CPU reconfiguration may be avoided when switching between P-CSI and A-CSI reporting.

Further, one or more aspects of the described techniques may provide for relaxation on the supported maximum number of configured CSI report settings. For example, it may be beneficial for the base station 105-a to dynamically vary the CSI granularity (e.g., and thus the feedback payload) depending on the uplink control information (UCI) coverage (e.g., wideband CSI for when UE 115-a is located on the cell edge and subband CSI for when UE 115-a is located near the cell center). However, in some cases, such may result in a UE supporting at least 2 or 3 CSI report settings per time domain behavior (e.g., Type I wideband CQI/wideband PMI, Type I subband CQI/widebandPMI, Type I subband CQI/subband PMI) which may result in an increase of not only processing complexity but also buffer requirements. For an NR-Light UE (e.g., UE 115-a), typical configuration may support one CSI report setting for CSI report per time domain behavior. To vary the CSI granularity, the base station may RRC reconfigure the UE as it moves within the cell (e.g., which may be associated with undesirable latency and overhead). As such, the techniques described herein may provide for dynamic reconfiguration using either MAC CE or DCI for varying the CSI granularity. With the DCI approach, CSI granularity for the same CSI report setting may be associated with different CSI triggering states, and with the MAC CE based approach, the MAC CE may be used to update the CSI granularity for a CSI reporting setting.

Additionally or alternatively, one or more aspects of the described techniques may provide for relaxation on the support of mixes of codebook types. A low-tier NR-Light UE (e.g., UE 115-a) may indicate whether to be triggered with CSI reports with mixes of codebook types (e.g., UE 115-a may indicate it supports either 2 CSI reports for Type I codebook with 8 ports in 1 resource or a single CSI report for Type II codebook with 8 ports in a resource, but not simultaneous CSI reports for Type 1 and 2 codebook). Base station 105-a may dynamically switch between different types of codebook based on the UE's uplink coverage and the downlink beamforming accuracy. For example, when UE 115-a is located on the cell edge it may only have uplink coverage to reliably transmit a low resolution Type I wideband PMI/CQI report whereas when UE 115-a is located near the center of the cell it may be able to afford to transmit a high resolution Type II subband PMI/CQI report. In some examples, the switch may be based on DCI (e.g., one triggering state for A-CSI associated with Type I codebook and another state for Type II codebook). In some cases, UE 115-a may not be expected to receive the CSI trigger for a different codebook type before the last symbol of PUSCH carrying the current CSI report. Additionally or alternatively, the switch may be based on a MAC CE transmitted by the base station 105-a. The activation of one CSI report may automatically deactivate the CSI report of another codebook type.

Additionally or alternatively, one or more aspects of the described techniques may provide for relaxation on the support of maximum number of configured CSI-RS resources and a maximum number of ports across all configured CSI-RS resources. A low-tier NR-Light UE (e.g., UE 115-a) may indicate a maximum number of configured CSI-RS resources and ports (e.g., CPUs) per time domain behavior based on its CSI reporting capability for periodic and aperiodic CSI reporting. For example, UE 115-a may indicate maximum number of CSI-RS resources separately for periodic CSI-RS and aperiodic CSI-RS resource. In some examples, UE 115-a may separately indicate a maximum number of CSI-RS resources and ports for CSI reporting and beam reporting, based on its CSI reporting capability for CSI reporting and beam reporting. In some cases, UE 115-a may indicate a number of supported CSI report settings, one or more supported codebooks, one or more supported port configurations, etc. (e.g., for feedback reporting) per time domain behavior (e.g., per feedback operations performed over some time duration or TTI).

Additionally or alternatively, one or more aspects of the described techniques may provide for relaxation on CSI processing timeline. For example, in some wireless communications systems (e.g., in NR systems) there may be two CSI timelines established to trade-off between processing complexity and buffer requirements. For example, a fast timeline (e.g., CSI computation delay requirement 1) may be configured for low-complexity CSI (e.g., wideband CSI derived from max 4-ports CSI-RS with Type I SP codebook. A slow timeline (e.g., CSI computation delay requirement 2) may be configured for high-complexity CSI (e.g., subband CSI with Type I SP codebook or wideband CSI with Type II codebook). The usage of the fast timeline may be rather limited (e.g., only for a single A-CSI report on PUSCH without uplink shared (UL-SCH) or HARQ-acknowledgement (ACK)) and may configure use of all the CPUs. For NR-Light (e.g., for UE 115-a), the support of the fast timeline may be optional according to UE 115-a capability, or may be further relaxed (e.g., in terms of CSI computation delay requirements), for example, only for maximum 2 ports and a subset of numerologies such as 15 kHz subcarrier spacing (SCS).

In some cases, UE 115-a may drop or suppress one or more feedback processing operations in cases where configured feedback reporting exceeds the feedback processing capability (e.g., the feedback reporting capability) of the UE 115-a. For example, UE 115-a may drop or suppress a feedback reporting configuration or UE 115-a may drop or suppress one or more feedback processing operations associated with a feedback reporting configuration in scenarios where there are not enough CPUs available for the UE 115-a to simultaneously perform feedback processing operations (e.g., CSI calculations on each CSI-RS) the UE is configured for. In other words, the UE 115-a may drop or suppress one or more feedback processing operations in cases where a conflict is present performing feedback processing operations according to the UE 115-a capability. Such a conflict may arise, for example, in scenarios where configured/triggered CSI reporting or beam reporting exceeds the feedback processing capability reported by UE 115-a. For example, in some cases, a UE 115-a may be utilizing all or most of its feedback processing resources (e.g., all CPUs may be actively performing feedback processing operations), and a trigger for aperiodic CSI may be received.

In such cases, the UE 115-a may suppress or drop feedback processing operations associated with the triggered aperiodic CSI (e.g., to be able to continue ongoing feedback processing operations), or the UE 115-a may suppress or drop ongoing feedback processing operations (e.g., to be able to perform the feedback processing operations associated with the triggered aperiodic CSI). According to the techniques described herein, UE 115-a may suppress or drop some subset of conflicting feedback processing operations (e.g. until the number of feedback processing operations is within the capability of the UE 115-a) based priorities associate with conflicting feedback processing operations, based on timing of feedback processing operations, or both.

Figure 3:
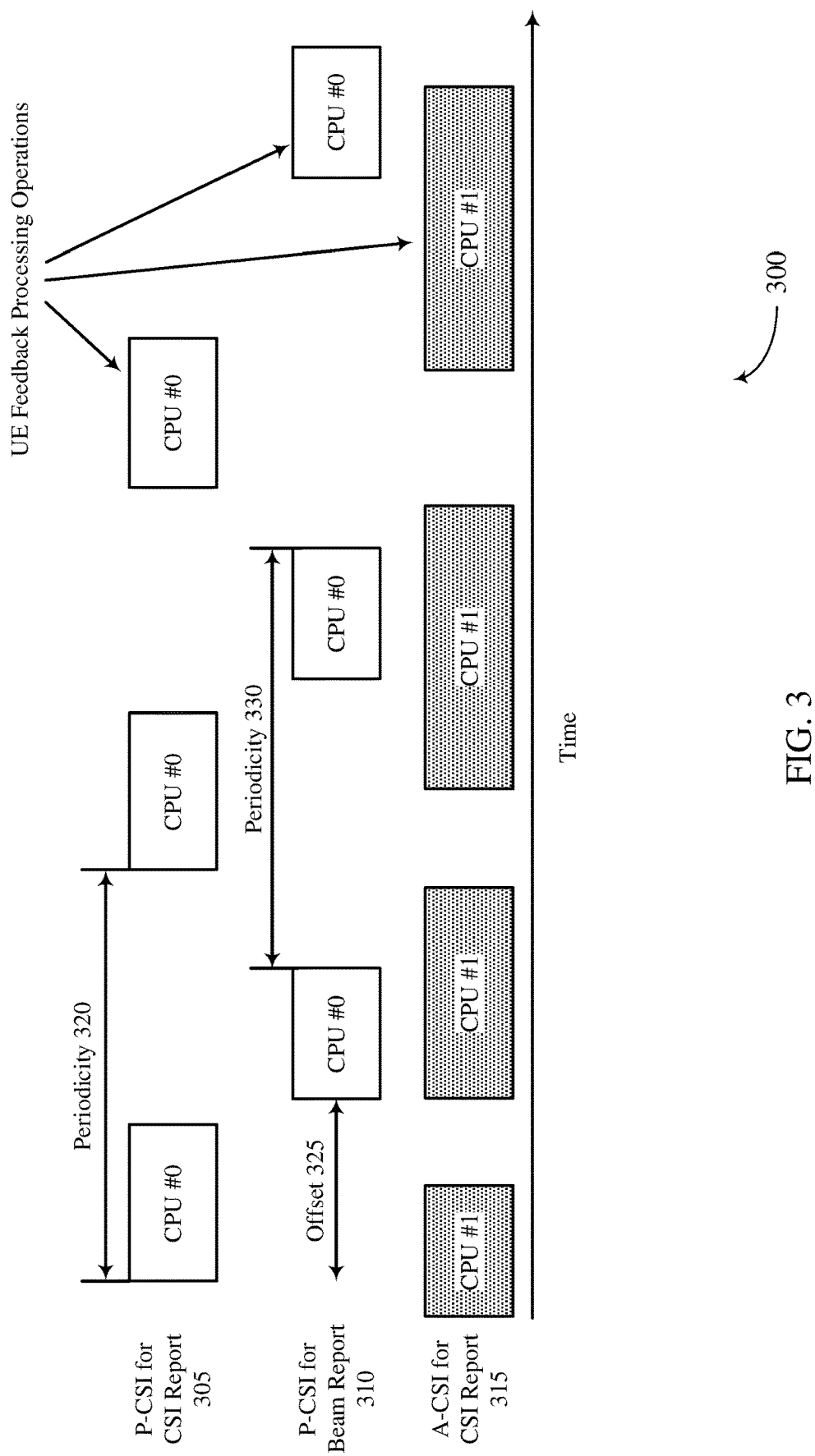
FIG. 3 illustrates an example of a feedback configuration scheme that supports processing enhancements for CSI reporting in accordance with aspects of the present disclosure.

FIG. 3 illustrates an example of a feedback configuration scheme 300 that supports processing enhancements for CSI reporting in accordance with aspects of the present disclosure. In some examples, feedback configuration scheme 300 may implement aspects of wireless communications system 100 and/or wireless communications system 200. For example, feedback configuration scheme 300 may illustrate base station configuration of UE feedback reporting (e.g., periodic CSI reporting, periodic beam reporting, and aperiodic CSI reporting) and resulting UE feedback processing operation. A UE may transmit a feedback reporting capability comprising a first feedback processing capability (e.g., a number of CPUs for periodic CSI reporting) and a second feedback processing capability (e.g., a number of CPUs for aperiodic CSI reporting). In the example of FIG. 3, a UE may transmit feedback reporting capability signaling indicating the UE supports a CPU (CPU #0) for periodic CSI reporting and a CPU (CPU #1) for aperiodic CSI reporting. As such, a base station may determine, and configure the UE with, a P-CSI for CSI report configuration 305, a P-CSI for beam report configuration 310, and an A-CSI for CSI report configuration 315. For example, based on the feedback reporting capability transmitted by the UE, the base station may determine periodicities and offsets for the shown configurations for improved UE feedback reporting (e.g., for efficient utilization of CPU #0 and CPU #1).

As discussed herein, a UE may indicate (e.g., via feedback reporting capability signaling or CSI report capability signaling) maximum simultaneous CSI reports separately for periodic CSI reporting and aperiodic CSI reporting. For example, feedback report capability signaling may include a value of a number of CPUs supported for periodic CSI processing operations (e.g., periodic CSI calculation) and a value of a number of CPUs supported for aperiodic CSI processing operations (e.g., aperiodic CSI calculation). As such, since CPUs may not be shared across periodic and aperiodic CSI reporting, a base station may configure different reporting periodicity and slot offset for multiple P-CSI reports that orthogonally share the same CPU to avoid the case of CSI not updated due to occupation.

For example, feedback configuration scheme 300 may illustrate a P-CSI for CSI report configuration 305, a P-CSI for beam report configuration 310, and an A-CSI for CSI report configuration 315. According to one or more aspects of the techniques described herein, a base station may determine and configure a UE with P-CSI for CSI report configuration 305, P-CSI for beam report configuration 310, and A-CSI for CSI report configuration 315 based on feedback reporting capability signaling received from the UE. A UE may indicate (e.g., via transmitting feedback reporting capability) that the UE supports (e.g., is capable of operating using) one CPU (e.g., CPU #0) for periodic CSI and one CPU (e.g., CPU #1) for aperiodic CSI.

As such, based on the UE feedback reporting capability, a base station may configure a UE with P-CSI for CSI report configuration 305, P-CSI for beam report configuration 310, and A-CSI for CSI report configuration 315. For example, a base station may determine and configure a periodicity 320 for P-CSI for CSI report configuration 305, and the base station may determine and configure an offset 325 and periodicity 330 for P-CSI for beam report configuration 310, such that the UE may efficiently utilize CPU #0 for feedback processing operations associated with the P-CSI for CSI report configuration 305 and the P-CSI for beam report configuration 310. In other words, P-CSI for CSI report configuration 305 and P-CSI for beam report configuration 310 may configure feedback processing operations (e.g., in accordance with a periodicity 320, an offset 325, and a periodicity 330 determined based on UE feedback reporting capability) such that the UE may perform the feedback processing operations and perform periodic CSI reporting and periodic beam reporting via CPU #1.

In some cases, P-CSI for CSI report configuration 305, P-CSI for beam report configuration 310, and A-CSI for CSI report configuration 315 may be configured in separate feedback reporting configurations, or may be configured jointly by a feedback reporting configuration. The UE may then perform feedback processing operations in accordance with P-CSI for CSI report configuration 305, P-CSI for beam report configuration 310, and A-CSI for CSI report configuration 315. As discussed herein, feedback processing operations may generally refer to UE processing operations associated with feedback determination and feedback reporting. For example, feedback processing operations may include channel measurements (e.g., RSRP measurements, reference signal received quality (RSRQ) measurements, signal-to-interference-plus-noise ratio (SINR) measurements, etc.), processing of channel measurements, CSI calculations (e.g., calculations to convert channel measurements into CSI), feedback report generation, feedback report transmission, etc.

Figure 4:
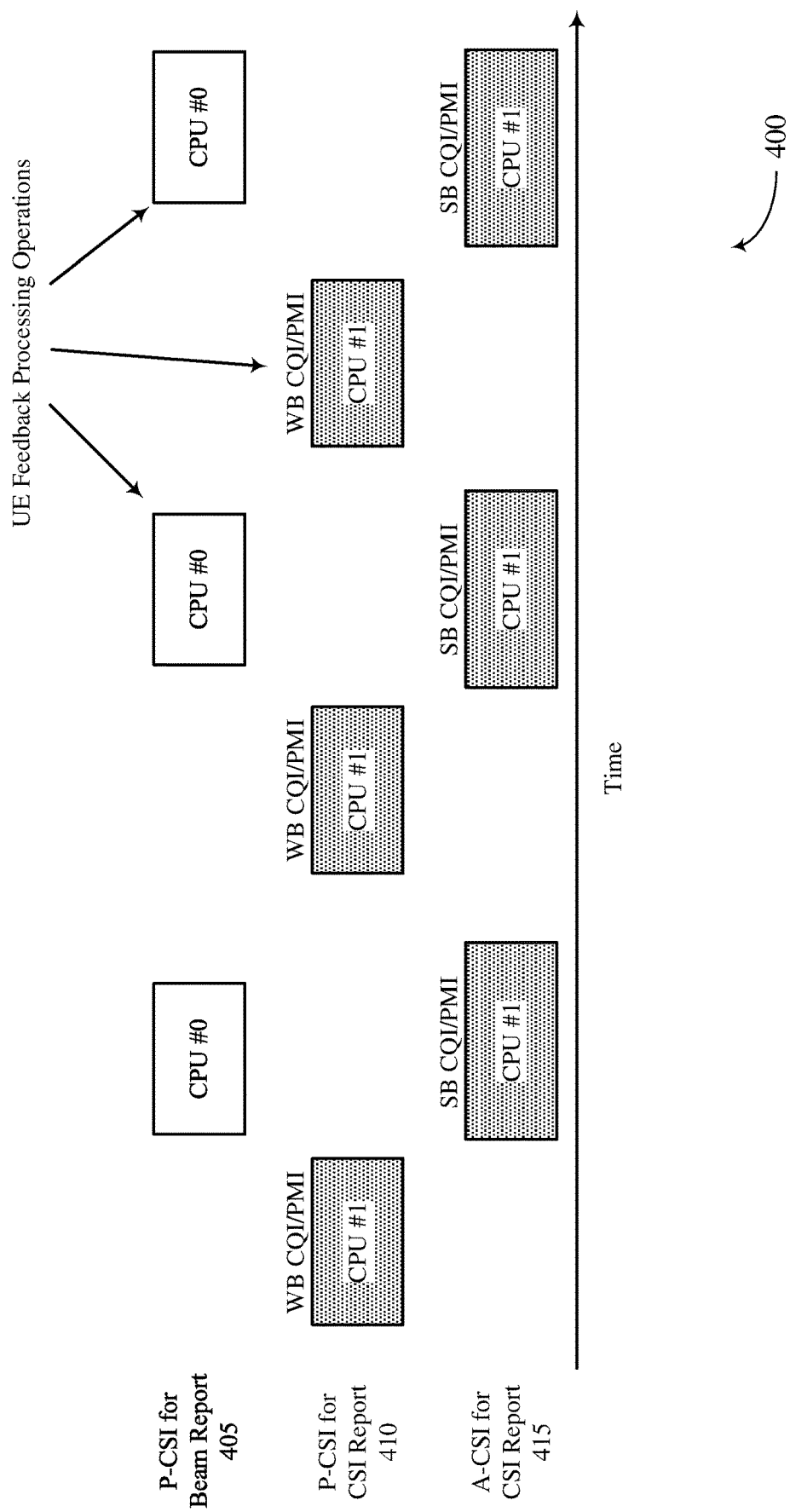
FIG. 4 illustrates an example of a feedback configuration scheme that supports processing enhancements for CSI reporting in accordance with aspects of the present disclosure.

FIG. 4 illustrates an example of a feedback configuration scheme 400 that supports processing enhancements for CSI reporting in accordance with aspects of the present disclosure. In some examples, feedback configuration scheme 400 may implement aspects of wireless communications system 100 and/or wireless communications system 200. For example, feedback configuration scheme 400 may illustrate base station configuration of UE feedback reporting (e.g., periodic CSI reporting, periodic beam reporting, and aperiodic CSI reporting) and resulting UE feedback processing operation. A UE may transmit a feedback reporting capability comprising a first feedback processing capability (e.g., a number of CPUs for beam reporting) and a second feedback processing capability (e.g., a number of CPUs for CSI reporting). In the example of FIG. 4, a UE may transmit feedback reporting capability signaling indicating the UE supports one CPU (CPU #0) for beam reporting and one CPU (CPU #1) for CSI reporting. As such, a base station may determine, and configure the UE with, a P-CSI for beam report configuration 405, a P-CSI for CSI report configuration 410, and an A-CSI for CSI report configuration 415. For example, based on the feedback reporting capability transmitted by the UE, the base station may determine periodicities and offsets for the shown configurations for improved UE feedback reporting (e.g., for efficient utilization of CPU #0 and CPU #1). Specifically, the base station may determine and configure A-CSI reporting in gaps between P-CSI reporting (e.g., P-CSI for CSI reporting), as the UE capability may indicate a single shared CPU (e.g., CPU #1) for CSI reporting.

As discussed herein, a UE may indicate (e.g., via feedback reporting capability signaling or CSI report capability signaling) maximum concurrent CSI reports separately for different CSI types (e.g., for CSI reporting and beam reporting). For example, feedback report capability signaling may include a value of a number of CPUs supported for processing operations associated with CSI reporting and a value of a number of CPUs supported for processing operations associated with beam reporting. As such, since CPUs may not be shared across CSI reporting and beam reporting, a base station may configure A-CSI reporting during gaps between P-CSI reporting such that A-CSI reports and P-CSI reports may orthogonally share the same CPU (e.g., CPU #1) to avoid the case of CSI not updated due to occupation. In such examples, P-CSI for beam reporting may be configured independently, as P-CSI for beam reporting may use a separate (e.g., independent) CPU (e.g., CPU #0).

For example, feedback configuration scheme 400 may illustrate a P-CSI for beam report configuration 405, a P-CSI for CSI report configuration 410, and an A-CSI for CSI report configuration 415. According to one or more aspects of the techniques described herein, a base station may determine and configure a UE with P-CSI for beam report configuration 405, P-CSI for CSI report configuration 410, and A-CSI for CSI report configuration 415 based on feedback reporting capability signaling received from the UE. A UE may indicate (e.g., via transmitting feedback reporting capability) that the UE supports (e.g., is capable of operating using) one CPU (e.g., CPU #0) for beam reporting and one CPU (e.g., CPU #1) for CSI reporting.

As such, based on the UE feedback reporting capability, a base station may configure a UE with P-CSI for beam report configuration 405, P-CSI for CSI report configuration 410, and A-CSI for CSI report configuration 415. For example, a base station may determine and configure a periodicity for P-CSI for CSI report configuration 410, and the base station may determine and configure any aperiodic CSI reporting of A-CSI for CSI report configuration 415 such that the UE may efficiently utilize CPU #1 for feedback processing operations associated with the periodic and aperiodic CSI reporting. In other words, P-CSI for CSI report configuration 410 and A-CSI for CSI report configuration 415 may configure feedback processing operations such that the UE may perform the feedback processing operations and perform periodic and aperiodic CSI reporting via CPU #1.

In some cases, P-CSI for beam report configuration 405, P-CSI for CSI report configuration 410, and A-CSI for CSI report configuration 415 may be configured in separate feedback reporting configurations, or may be configured jointly by a feedback reporting configuration. The UE may then perform feedback processing operations in accordance with P-CSI for beam report configuration 405, P-CSI for CSI report configuration 410, and A-CSI for CSI report configuration 415. As discussed herein, feedback processing operations may generally refer to UE processing operations associated with feedback determination and feedback reporting. For example, feedback processing operations may include channel measurements (e.g., RSRP measurements, RSRQ measurements, SNIR measurements, etc.), processing of channel measurements, CSI calculations (e.g., calculations to convert channel measurements into CSI), feedback report generation, feedback report transmission, etc. In the example of FIG. 4, UE feedback processing operations of P-CSI for CSI report configuration 410 may include wideband CQI/PMS processing operations and UE feedback processing operations of A-CSI for CSI report configuration 415 may include subband CQI/PMS processing operations.

Figure 5:
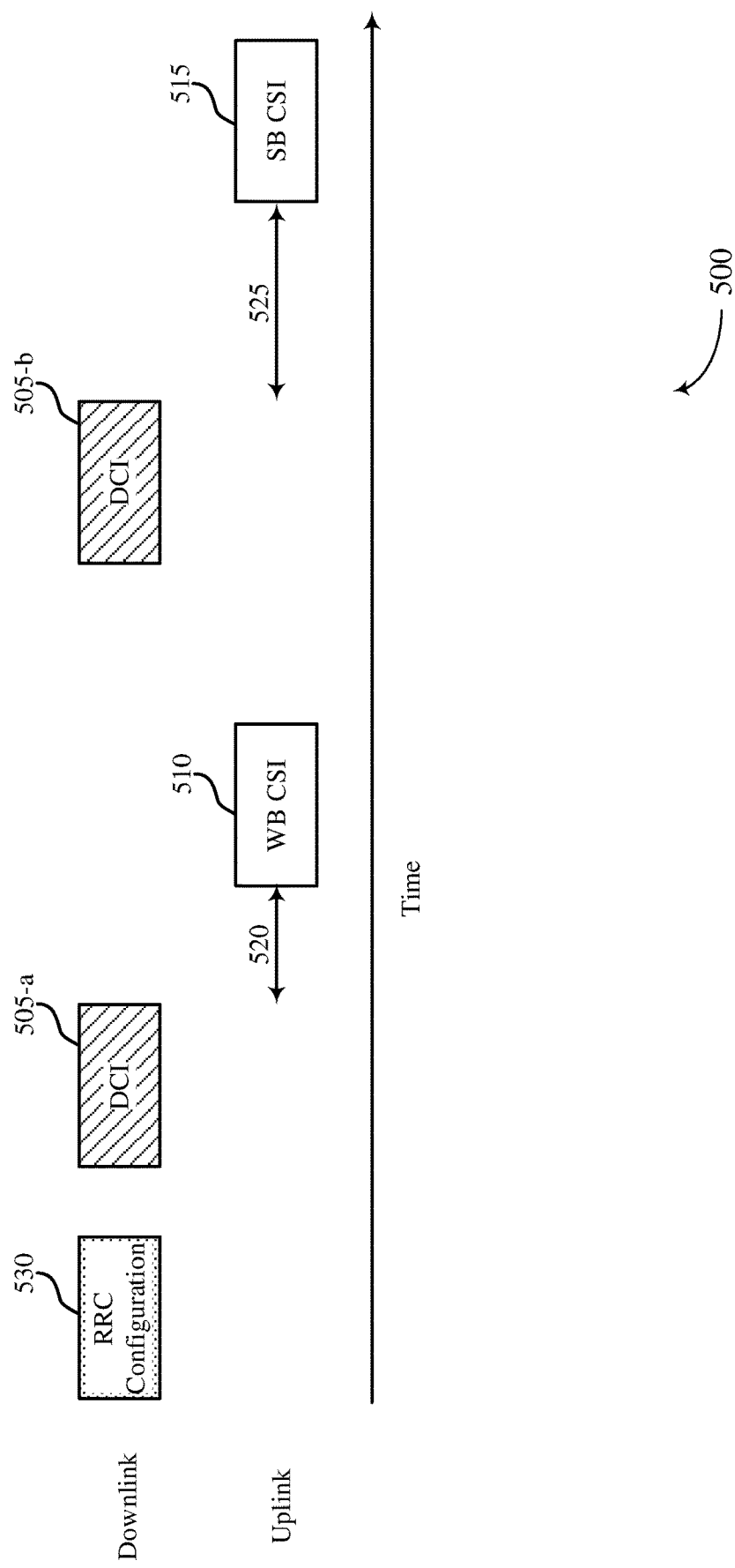
FIG. 5 illustrates an example of a downlink control information (DCI) triggering scheme that supports processing enhancements for CSI reporting in accordance with aspects of the present disclosure.

FIG. 5 illustrates an example of a DCI triggering scheme 500 that supports processing enhancements for CSI reporting in accordance with aspects of the present disclosure. In some examples, DCI triggering scheme 500 may implement aspects of wireless communications system 100 and/or wireless communications system 200. For example, DCI triggering scheme 500 may illustrate base station configuration of UE feedback reporting granularity and resulting UE feedback processing operation. A UE may transmit a feedback reporting capability comprising a feedback processing capability (e.g., an indication that the UE supports 1 CSI report settings per time domain behavior).

In some cases, a base station may transmit an RRC configuration 530 to a UE. As discussed herein, in some cases a UE (e.g., a low-tier NR-Light UE) may only support one CSI report setting per time domain behavior. In such cases, an RRC configuration 530 may configure a single CSI report setting for CSI reporting by the UE. The CSI report setting may configure, for example, parameters such as bandwidth, subbands, time resources (e.g., CSI-RS resources, measurement periodicity), transmission mode, spatial layers, and the like. As such, DCI 505 may be used to dynamically trigger the CSI report setting with different granularity. For example, either wideband CSI reporting or subband CSI reporting may be triggered (e.g., via CSI triggering states of DCI 505, as discussed herein) for a single CSI report setting configured by RRC configuration 530.

As discussed herein, dynamic reconfiguration of UE feedback reporting granularity may be performed using MAC CE signaling or DCI signaling (e.g., MAC CE signaling or DCI signaling may vary CSI granularity). FIG. 5 may illustrate DCI based configuration of CSI granularity for the CSI report setting (e.g., CSIReportSetting=0) indicated via the feedback reporting capability transmitted by the UE. For example, DCI 505-*a* and DCI 505-*b* may be associated with different CSI triggering states. DCI 505-*a* may be associated with a CSI triggering state (e.g., CSIReportSetting=0, WBCSI=True) that triggers the CSI report setting with a wideband granularity, and DCI 505-*b* may be associated with a CSI triggering state (e.g., CSIReportSetting=0, WBCSI=False) that triggers the CSI report setting with a subband granularity. As such, upon receiving DCI 505-*a* (e.g., and after a CSI processing time 520 for wideband CSI) a UE may transmit wideband CSI report 510 to the base station. Similarly, upon receiving DCI 505-*b* (e.g., and after a CSI processing time 525 for subband CSI) a UE may transmit subband CSI report 515 to the base station.

Figure 6:
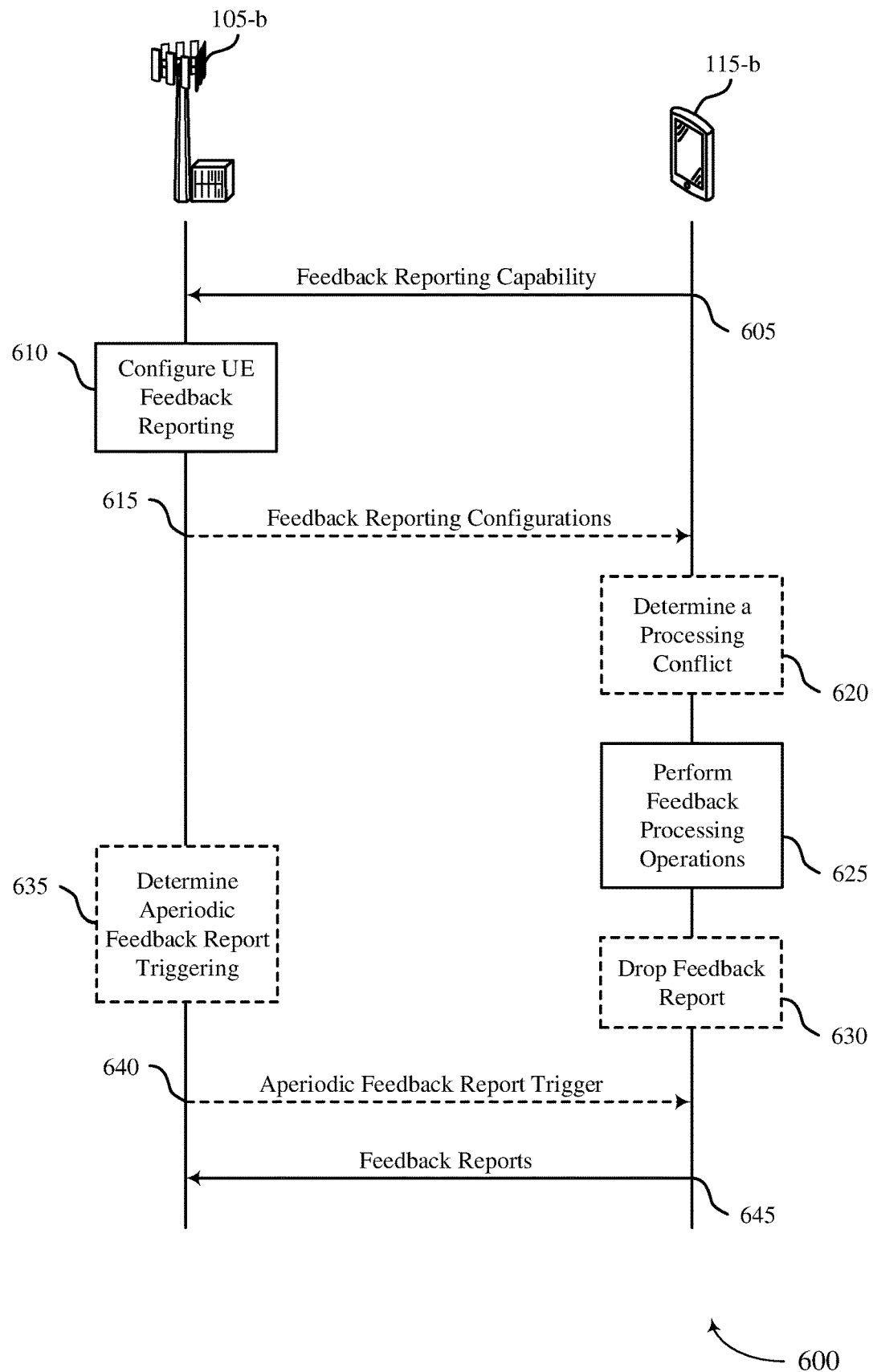
FIG. 6 illustrates an example of a process flow that supports processing enhancements for CSI reporting in accordance with aspects of the present disclosure.

FIG. 6 illustrates an example of a process flow 600 that supports processing enhancements for CSI reporting in accordance with aspects of the present disclosure. In some examples, process flow 600 may implement aspects of wireless communications system 100 and/or wireless communications system 200. Process flow 600 may include a base station 105-*b* and a UE 115-*b*, which may be examples of corresponding base stations 105 and UEs 115, as described above with reference to FIGS. 1-5. In the following description of the process flow 600, the operations between UE 115-*b* and base station 105-*b* may be transmitted in a different order than the order shown, or the operations performed by base station 105-*b* and UE 115-*b* may be performed in different orders or at different times. Certain operations may also be left out of the process flow 600, or other operations may be added to the process flow 600. It is to be understood that while base station 105-*b* and UE 115-*b* are shown performing a number of the operations of process flow 600, any wireless device may perform the operations shown.

At 605, UE 115-*b* may transmit a feedback reporting capability including a first feedback processing capability and a second feedback processing capability. For example, in some cases the first feedback processing capability may include a number of CPUs or a number of simultaneous feedback processing operations supported for periodic feedback reporting (e.g., periodic CSI reporting, periodic beam reporting, etc.) and the second feedback processing capability may include a number of CPUs or a number of simultaneous feedback processing operations supported for aperiodic feedback reporting (e.g., aperiodic CSI reporting). In some examples, the first feedback processing capability may include a number of CPUs or a number of simultaneous feedback processing operations supported for a first type of feedback reporting (e.g., CSI reporting) and the second feedback processing capability may include a number of CPUs or a number of simultaneous feedback processing operations supported for a second type of feedback reporting (e.g., beam reporting).

At 610, base station 105-*b* may determine one or more configurations for UE 115-*b* feedback reporting (e.g., based on the feedback reporting capability received at 605). For example, base station 105-*b* may determine or identify a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability. In some examples, base station 105-*b* may determine or identify periodicities and offsets for the one or more configurations of feedback processes for the UE 115-*b* such that UE processing operations associated with the one or more configurations for UE feedback reporting does not exceed the feedback processing capability of the UE 115-*b*.

At 615, base station 105-*b* may transmit the one or more configurations for feedback reporting to the UE 115-*b*. In some cases, base station 105-*b* may further configure parameters for a set of beam reporting feedback processes for the UE such that processing associated with the set of beam reporting feedback processes does not exceed the processing capability associated with beam reporting. For example, in some cases, the base station 105-*b* may configure CSI-RS, time durations, feedback processing operations, etc. associated with UE 115-*b* feedback processing such that the feedback reporting capability of the UE 115-*b* is not exceeded.

At 620, UE 115-*b* may, in some cases determine whether a processing conflict (e.g., a conflict in being able to perform feedback processing operations based on the UE 115-*b* feedback reporting capability) is present based on the one or more configurations for feedback reporting received at 615.

At 625, UE 115-*b* may perform feedback processing operations based at least in part on the one or more configurations for feedback reporting received at 615. For example, UE 115-*b* may perform a set of feedback processing operations according to the first and second feedback processing capabilities. In some cases, the set of feedback processing operations may include at least one processing operation associated with a CSI report and at least one processing operation associated with a beam report. In cases where a conflict is determined at 620, the UE 115-*b* may perform feedback processing operations based at least in part on the conflict (e.g., the UE 115-*b* may suppress at least one of the two or more conflicting feedback processing operations based on priorities or timing of the conflicting feedback processing operations), as described in more detail herein (e.g., with reference to FIG. 8). For example, in some cases (e.g., when the UE 115-*b* determines a processing conflict between two or more of the feedback processing operations at 620), UE 115-*b* may drop a feedback report (e.g., may suppress or drop one or more feedback processing operations associated with a configured feedback reporting configuration) at 630.

In some cases, at 635, base station 105-*b* may determine an A-CSI feedback configuration (e.g., the base station 105-*b* may determine when to trigger an A-CSI feedback report) based on the one or more configurations for UE 115-*b* feedback reporting determined at 610. That is, in some cases, base station 105-*b* may desire to trigger an A-CSI report, and the base station 105-*b* may configure the timing of UE feedback processing operations associated with the A-CSI reporting in accordance with UE 115-*b* feedback reporting capability and feedback reporting configured at 610 (e.g., base station 105-*b* may configure the timing of UE feedback processing operations associated with the A-CSI reporting as discussed in further detail herein, for example, with reference to FIG. 4.). In cases where the base station 105-*b* determines an A-CSI feedback configuration, the base station 105-*b* may transmit an aperiodic feedback report trigger at 640 in accordance with the A-CSI feedback configuration.

At 645, UE 115-b may transmit a set of feedback reports (e.g., including the channel state information report and the beam report) based on the one or more configurations for feedback reporting received at 615. As discussed herein, in some cases, the set of feedback reports transmitted at 645 may further depend on whether a conflict was determined at 620 (e.g., as in some cases one or more feedback reports that were configured at 615 may be dropped or suppressed).

Figure 7:
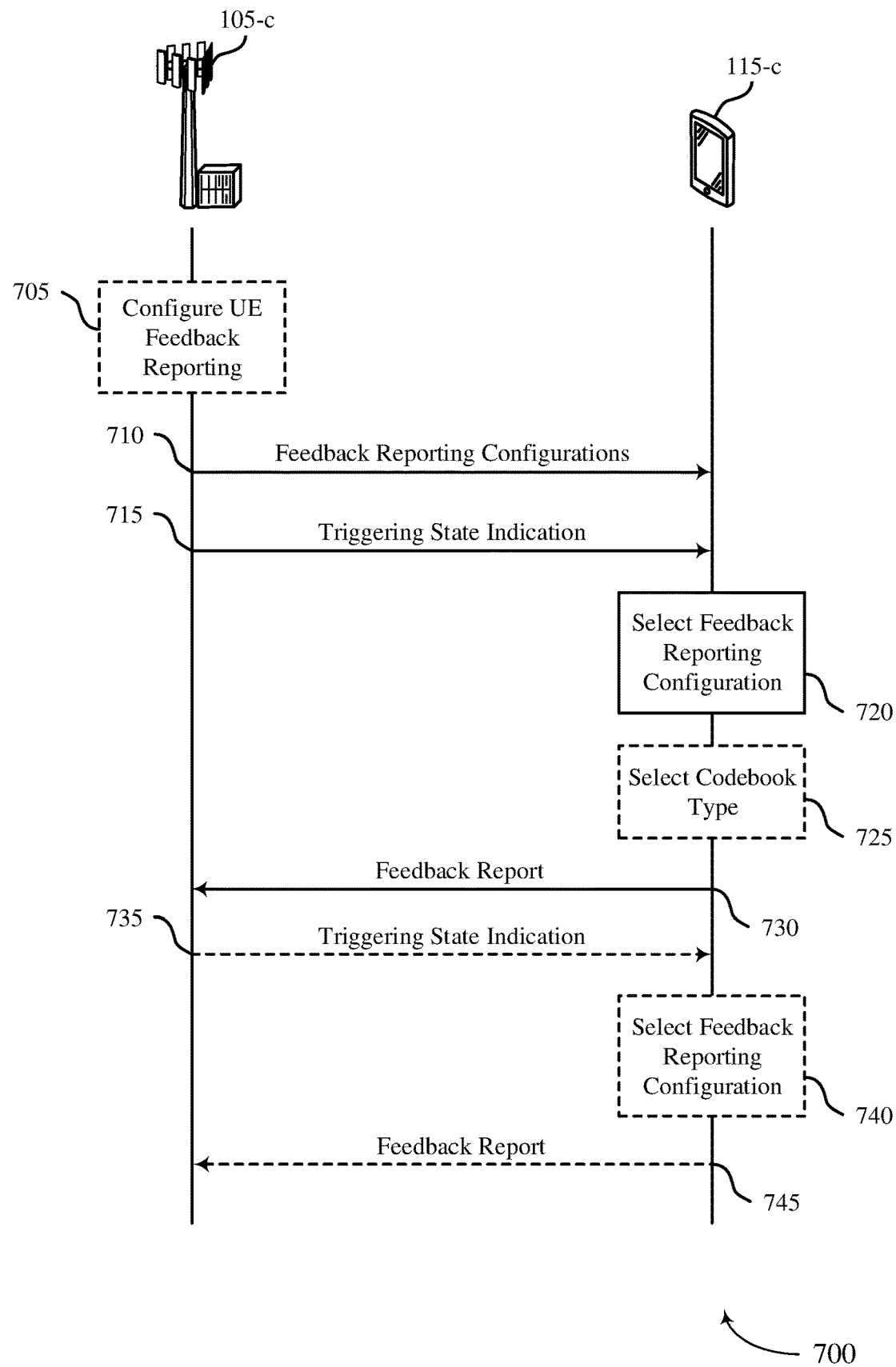
FIG. 7 illustrates an example of a process flow that supports processing enhancements for CSI reporting in accordance with aspects of the present disclosure.

FIG. 7 illustrates an example of a process flow 700 that supports processing enhancements for CSI reporting in accordance with aspects of the present disclosure. In some examples, process flow 700 may implement aspects of wireless communications system 100 and/or wireless communications system 200. Process flow 700 may include a base station 105-c and a UE 115-c, which may be examples of corresponding base stations 105 and UEs 115, as described above with reference to FIGS. 1-6. In the following description of the process flow 700, the operations between UE 115-c and base station 105-c may be transmitted in a different order than the order shown, or the operations performed by base station 105-c and UE 115-c may be performed in different orders or at different times. Certain operations may also be left out of the process flow 700, or other operations may be added to the process flow 700. It is to be understood that while base station 105-c and UE 115-c are shown performing a number of the operations of process flow 700, any wireless device may perform the operations shown.

At 705, base station 105-c may determine one or more configurations for UE 115-c feedback reporting. At 710, base station 105-c may configure UE 115-c (e.g., transmit signaling to UE 115-c indicative of a configuration) for feedback reporting according to a set of feedback configurations. For example, the set of feedback configurations may include a single feedback configuration (e.g., CSI report setting) for each time domain behavior. In some cases, the set of feedback configurations may include a single feedback configuration for each time domain behavior for each of CSI and beam reporting.

At 715, base station 105-c may transmit a triggering state indication to UE 115-c (e.g., for dynamic control or configuration of feedback reporting granularity). For example, as described herein, base station 105-c may transmit DCI signaling and/or MAC CE signaling to UE 115-c, where the DCI signaling and/or MAC CE signaling may configure feedback reporting granularity (e.g., wideband or subband granularity) for a CSI report setting of the UE 115-c. Additionally or alternatively, the triggering state indication may indicate a codebook type (e.g., Type I or Type II) for configured UE 115-c feedback reporting. For example, as discussed herein, one triggering state for A-CSI may be associated with Type I codebook and another triggering state may be associated with Type II codebook.

At 720, base station 105-c may select a reporting configuration (e.g., based on the one or more feedback reporting configurations received at 710). At 725, UE 115-c may, in some cases, select a codebook type (e.g., based on the triggering state indication received at 715). At 730, UE 115-c may transmit one or more feedback reports to base station 105-c. for example, in some cases, UE 115-c may transmit a feedback report based at least in part on a granularity, a codebook type, or both, indicated by the triggering state indication received at 715.

In some examples, base station 105-c may transmit an additional triggering state indication (e.g., to reconfigure feedback reporting granularity, to reconfigure a codebook for configured UE 115-c feedback reporting, or both). In such cases, UE 115-c may select a feedback reporting configuration at 740, perform feedback processing operations in accordance with the feedback reporting operation, and, at 745, transmit one or more feedback reports to base station 105-c.

Figure 8:
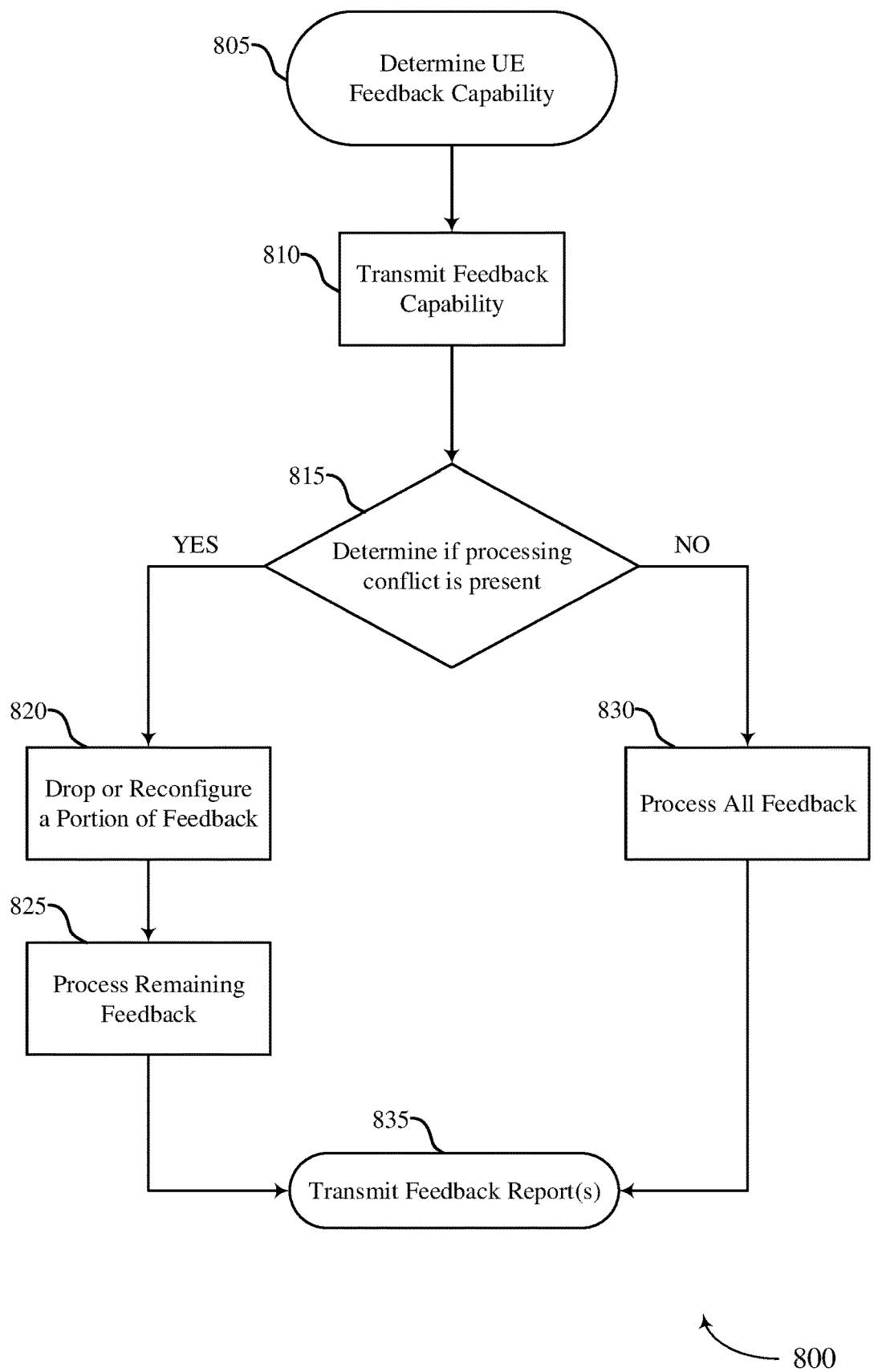
FIG. 8 illustrates an example of a flowchart that supports processing enhancements for CSI reporting in accordance with aspects of the present disclosure.

FIG. 8 illustrates an example of a flow chart 800 that supports processing enhancements for CSI reporting in accordance with aspects of the present disclosure. In some examples, flow chart 800 may implement aspects of wireless communications system 100 and/or wireless communications system 200. In the following description of the flow chart 800, operations performed by a UE 115, and the operations may be performed in different orders or at different times than shown. Certain operations may also be left out of the flow chart 800, or other operations may be added to the flow chart 800. It is to be understood that the operations of flow chart 800 are described as being performed by a UE 115, any wireless device may perform the operations shown.

At 805, a UE may determine UE feedback capability. For example, a UE may identify a number of supported CPUs, and may determine a UE feedback capability report based on some distribution of the supported CPUs (e.g., across periodic and aperiodic CSI reporting, across different types of feedback reporting, such as beam reporting and CSI reporting, etc.). For example, a UE may identify or determine that it supports 3 CPUs, and the UE may determine some distribution of the 3 CPUs to handle various feedback reporting/feedback processing operations as described in more detail herein.

At 810, a UE may transmit feedback capability to a base station. For example, as discussed herein, a UE may report feedback processing capability (e.g., transmit a feedback reporting capability) separately for periodic feedback reporting and for aperiodic feedback reporting, for different types of feedback reporting (e.g., for CSI reporting, for beam management reporting, etc.), etc. For example, a UE may transmit a feedback reporting capability report to a base station, and the feedback reporting capability report may include separate indications of feedback processing capability (e.g., feedback reporting capability) for periodic feedback reporting and for aperiodic feedback reporting, for different types of feedback reporting (e.g., for CSI reporting, for beam management reporting, etc.), etc.

At 815, a UE may determine if a processing conflict is present. For example, a UE may receive one or more feedback reporting configurations and, in some cases, multiple feedback reporting configurations may result in conflict regarding usage of UE CPU resources. For example, in some cases, a UE may support a single CPU for CSI reporting (e.g., as well as a single CPU for beam reporting), and the UE may receive an A-CSI configuration that conflicts with a configured P-CSI configuration. As such, the UE may determine a processing conflict such that the CPU for CSI reporting is associated with a conflict in configured feedback processing operations for the A-CSI reporting and the P-CSI reporting. Additionally or alternatively, a UE may support a single CPU for periodic feedback reporting (e.g., as well as a single CPU for aperiodic feedback reporting), and a P-CSI for beam reporting may conflict with a P-CSI for CSI reporting.

In cases where the UE does not identify such a processing conflict between two or more of feedback processing operations, at 830 the UE may process all feedback and at 835 the UE may report feedback to the base station according to configured feedback reporting. In cases where the UE does identify a processing conflict between two or more of feedback processing operations associated with feedback reporting configurations, at 820 the UE may drop or reconfigure a portion of feedback processing operations. For example, the UE may suppress at least one of the two or more conflicting feedback processing operations based on priorities or timing of the two or more conflicting feedback processing operations. For example, in some cases, a UE may drop a lower priority conflicting feedback processing operation or a later configured conflicting feedback processing operation (e.g., in some cases, a feedback processing operation of a P-CSI may be suppressed or dropped when it conflicts with a feedback processing operation of an A-CSI). At 825, when CPU resources become available, the UE may perform remaining feedback processing operations (e.g., remaining feedback processing operations that were suppressed at 820 due to the conflict). At 835, the UE may report feedback to the base station according to configured feedback reporting.

Figure 9:
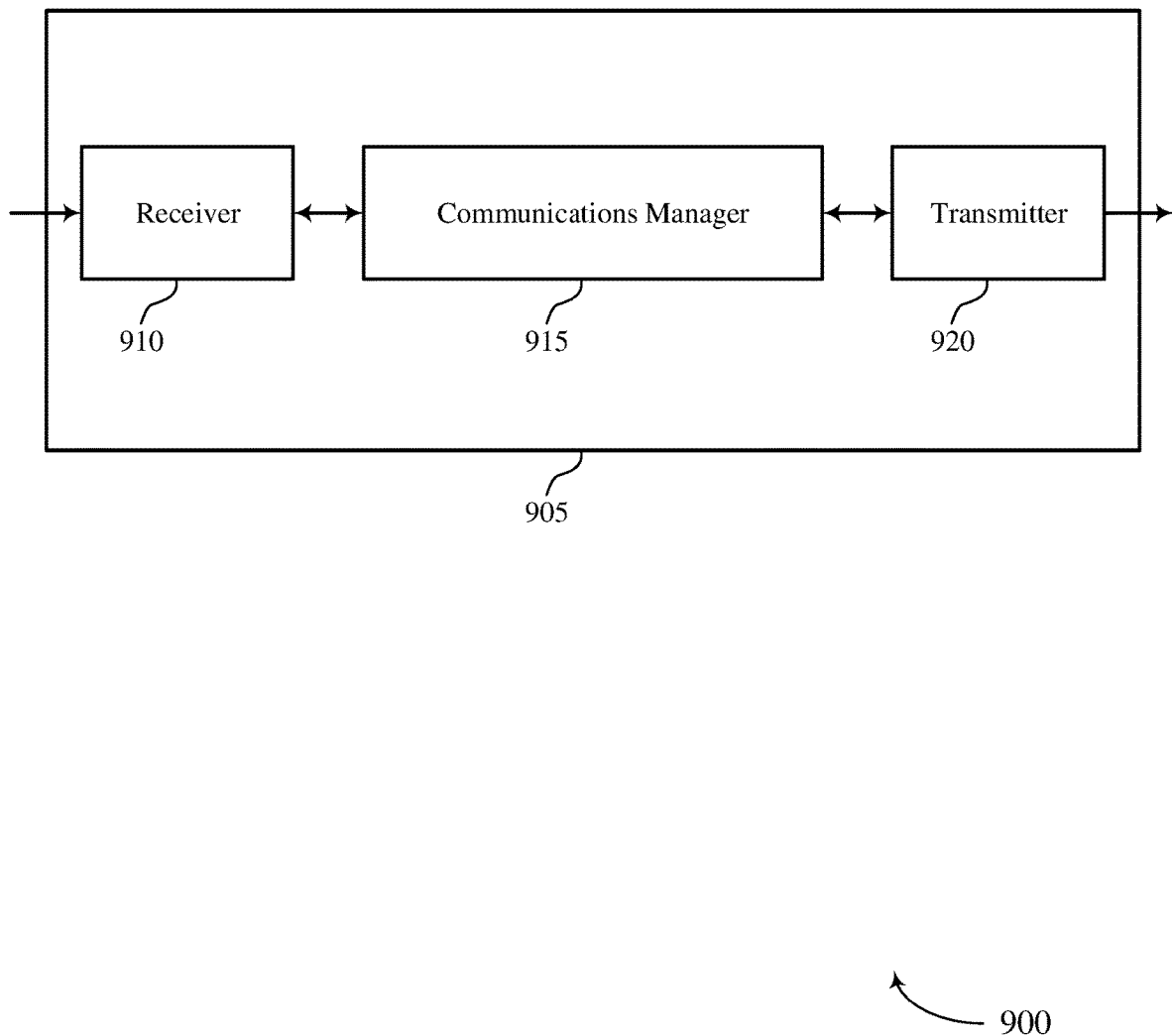
FIGS. 9 and 10 show block diagrams of devices that support processing enhancements for CSI reporting in accordance with aspects of the present disclosure.

FIG. 9 shows a block diagram 900 of a device 905 that supports processing enhancements for CSI reporting in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to processing enhancements for CSI reporting, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit a feedback reporting capability including a first feedback processing capability and a second feedback processing capability, perform a set of feedback processing operations according to the first and second feedback processing capabilities, the set of feedback processing operations including at least one processing operation associated with a channel state information report and at least one processing operation associated with a beam report, and transmit a set of feedback reports including the channel state information report and the beam report. The communications manager 915 may also receive a feedback reporting configuration including a set of parameter sets corresponding to a set of reporting granularities, receive an indication of a triggering state for feedback reporting, select one of the set of parameter sets based on the received indication of the triggering state, and transmit a feedback report associated with the feedback reporting configuration based on the selecting. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, a CPU, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
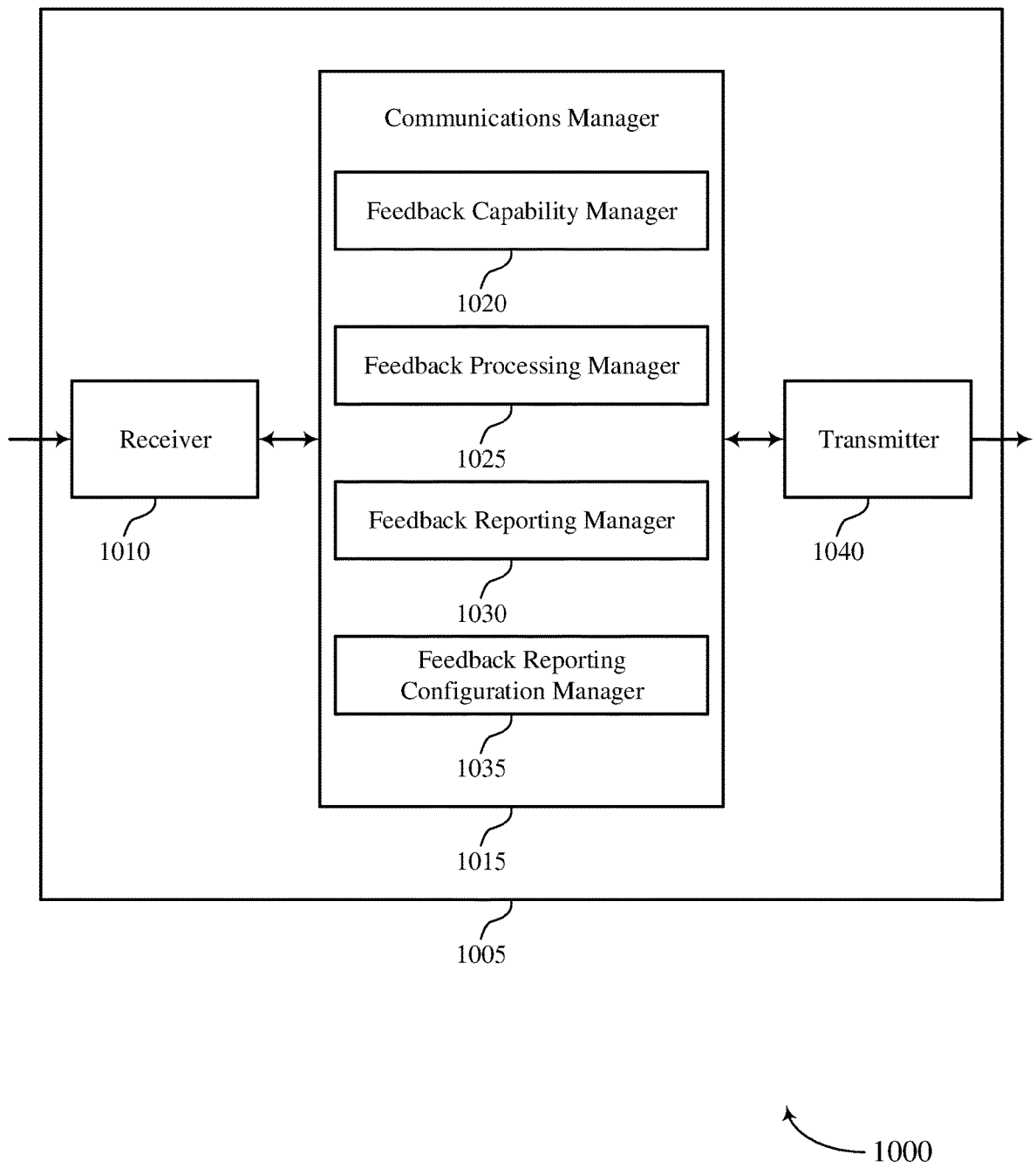

FIG. 10 shows a block diagram 1000 of a device 1005 that supports processing enhancements for CSI reporting in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to processing enhancements for CSI reporting, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a feedback capability manager 1020, a feedback processing manager 1025, a feedback reporting manager 1030, and a feedback reporting configuration manager 1035. The communications manager 1015 may be an example of aspects of the communications manager 1210 described herein.

The feedback capability manager 1020 may transmit a feedback reporting capability including a first feedback processing capability and a second feedback processing capability.

The feedback processing manager 1025 may perform a set of feedback processing operations according to the first and second feedback processing capabilities, the set of feedback processing operations including at least one processing operation associated with a channel state information report and at least one processing operation associated with a beam report. For example, the feedback processing manager 1025 may identify time-frequency resources over which a CSI-RS is transmitted, and the feedback processing manager 1025 may perform channel measurements (e.g., RSRP measurements, RSRQ measurements, SNIR measurements, etc.), perform CSI calculations (e.g., process channel measurements and perform calculations to convert channel measurements into CSI), etc. In some cases, the feedback processing manager 1025 may include or refer to a CPU. A CPU may generally refer to processing resources (e.g., circuitry, virtual pipelines, etc.) for processing CSI. For example, device 1005 may (e.g., in accordance with base station configuration of feedback reporting) load information from memory and configure CPUs to perform one or more aspects of the techniques described herein.

The feedback reporting manager 1030 may transmit a set of feedback reports including the channel state information report and the beam report.

The feedback reporting configuration manager 1035 may receive a feedback reporting configuration including a set of parameter sets corresponding to a set of reporting granularities, receive an indication of a triggering state for feedback reporting, and select one of the set of parameter sets based on the received indication of the triggering state. The feedback reporting manager 1030 may transmit a feedback report associated with the feedback reporting configuration based on the selecting.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
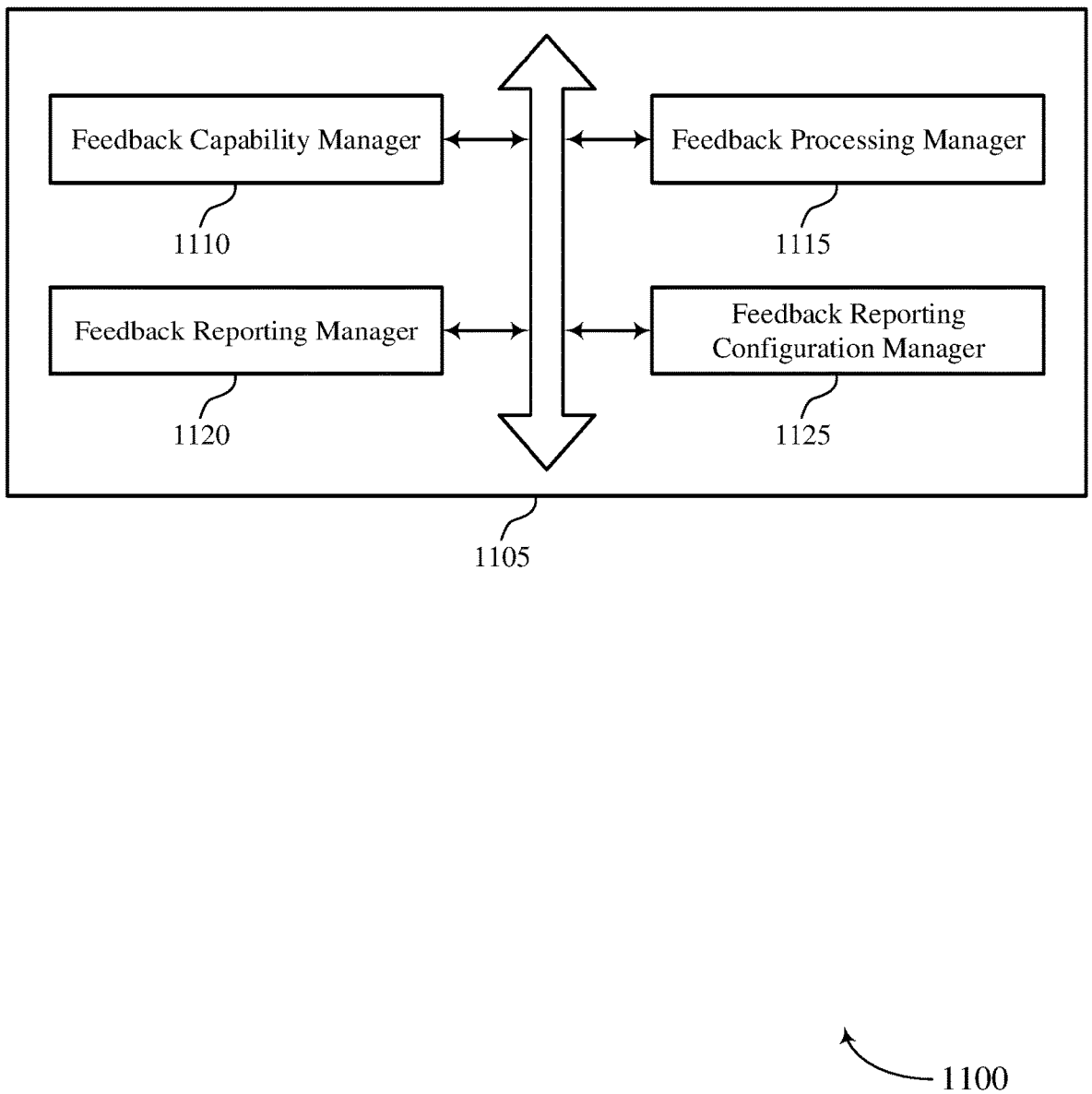
FIG. 11 shows a block diagram of a communications manager that supports processing enhancements for CSI reporting in accordance with aspects of the present disclosure.

FIG. 11 shows a block diagram 1100 of a communications manager 1105 that supports processing enhancements for CSI reporting in accordance with aspects of the present disclosure. The communications manager 1105 may be an example of aspects of a communications manager 915, a communications manager 1015, or a communications manager 1210 described herein. The communications manager 1105 may include a feedback capability manager 1110, a feedback processing manager 1115, a feedback reporting manager 1120, and a feedback reporting configuration manager 1125. Each of these modules may communicate, directly or indirectly, with one another (e.g., via one or more buses).

The feedback capability manager 1110 may transmit a feedback reporting capability including a first feedback processing capability and a second feedback processing capability.

The feedback processing manager 1115 may perform a set of feedback processing operations according to the first and second feedback processing capabilities, the set of feedback processing operations including at least one processing operation associated with a channel state information report and at least one processing operation associated with a beam report. In some examples, the feedback processing manager 1115 may perform feedback processing operations for the first set of feedback reporting configurations according to the first feedback processing capability. In some examples, the feedback processing manager 1115 may determine a processing conflict between two or more of the feedback processing operations associated with the first set of feedback reporting configurations. In some examples, the feedback processing manager 1115 may suppress at least one of the two or more of the feedback processing operations based on the determined processing conflict and at least one of priorities or timing of the two or more of the feedback processing operations.

In some examples, the feedback processing manager 1115 may perform feedback processing operations for the second set of feedback reporting configurations according to the second feedback processing capability and independently of the first feedback processing capability. In some cases, the first type of feedback corresponds to one of periodic or aperiodic feedback reporting and the second type of feedback corresponds to the other of periodic or aperiodic feedback reporting. In some cases, the first type of feedback corresponds to channel state information reporting and the second type of feedback corresponds to beam reporting.

The feedback reporting manager 1120 may transmit a set of feedback reports including the channel state information report and the beam report. In some examples, the feedback reporting manager 1120 may transmit a feedback report associated with the feedback reporting configuration based on the selecting.

The feedback reporting configuration manager 1125 may receive a feedback reporting configuration including a set of parameter sets corresponding to a set of reporting granularities. In some examples, the feedback reporting configuration manager 1125 may receive an indication of a triggering state for feedback reporting. In some examples, the feedback reporting configuration manager 1125 may select one of the set of parameter sets based on the received indication of the triggering state. In some examples, the feedback reporting configuration manager 1125 may receive a first set of feedback reporting configurations associated with the first type of feedback reporting. In some examples, the feedback reporting configuration manager 1125 may receive a second set of feedback reporting configurations associated with the second type of feedback reporting.

In some cases, each of the set of parameter sets is associated with one of wideband or subband channel quality indicator (CQI) reporting and one of wideband or subband precoding matrix indicator (PMI) reporting. In some cases, each of the set of parameter sets is associated with one of a first codebook type or a second codebook type. In some cases, the indication of the triggering state is received in a downlink control channel. In some cases, the indication of the triggering state is received in a medium access control (MAC) control element.

Figure 12:
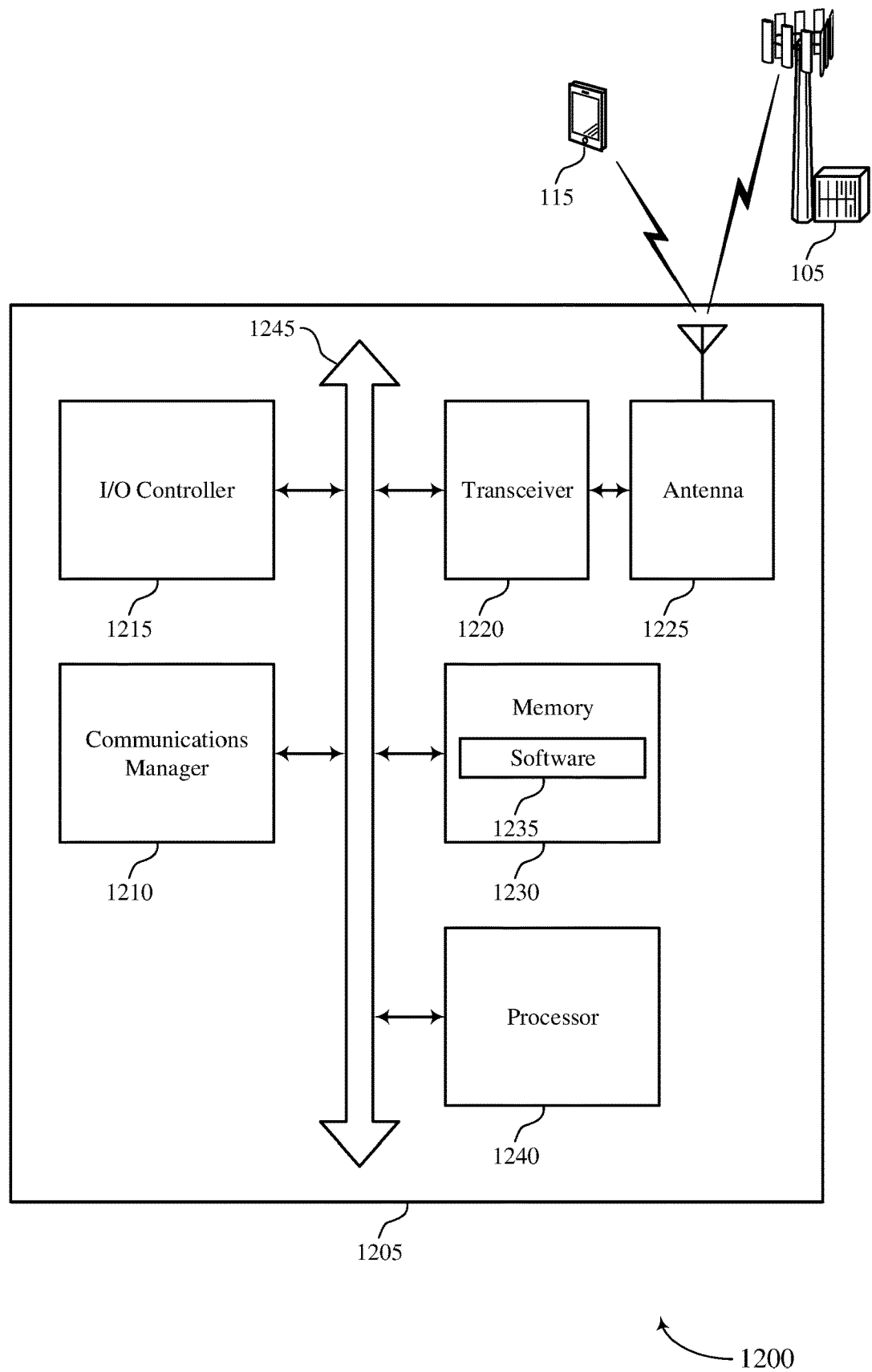
FIG. 12 shows a diagram of a system including a device that supports processing enhancements for CSI reporting in accordance with aspects of the present disclosure.

FIG. 12 shows a diagram of a system 1200 including a device 1205 that supports processing enhancements for CSI reporting in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit a feedback reporting capability including a first feedback processing capability and a second feedback processing capability, perform a set of feedback processing operations according to the first and second feedback processing capabilities, the set of feedback processing operations including at least one processing operation associated with a channel state information report and at least one processing operation associated with a beam report, and transmit a set of feedback reports including the channel state information report and the beam report.

The communications manager 1210 may also receive a feedback reporting configuration including a set of parameter sets corresponding to a set of reporting granularities, receive an indication of a triggering state for feedback reporting, select one of the set of parameter sets based on the received indication of the triggering state, and transmit a feedback report associated with the feedback reporting configuration based on the selecting.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code or software 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting processing enhancements for CSI reporting).

The software 1235 may include instructions to implement aspects of the present disclosure, including instructions to support wireless communications. The software 1235 may be stored in a non-transitory computer-readable medium such as system memory or other type of memory. In some cases, the software 1235 may not be directly executable by the processor 1240 but may cause a computer (e.g., when compiled and executed) to perform functions described herein.

Figure 13:
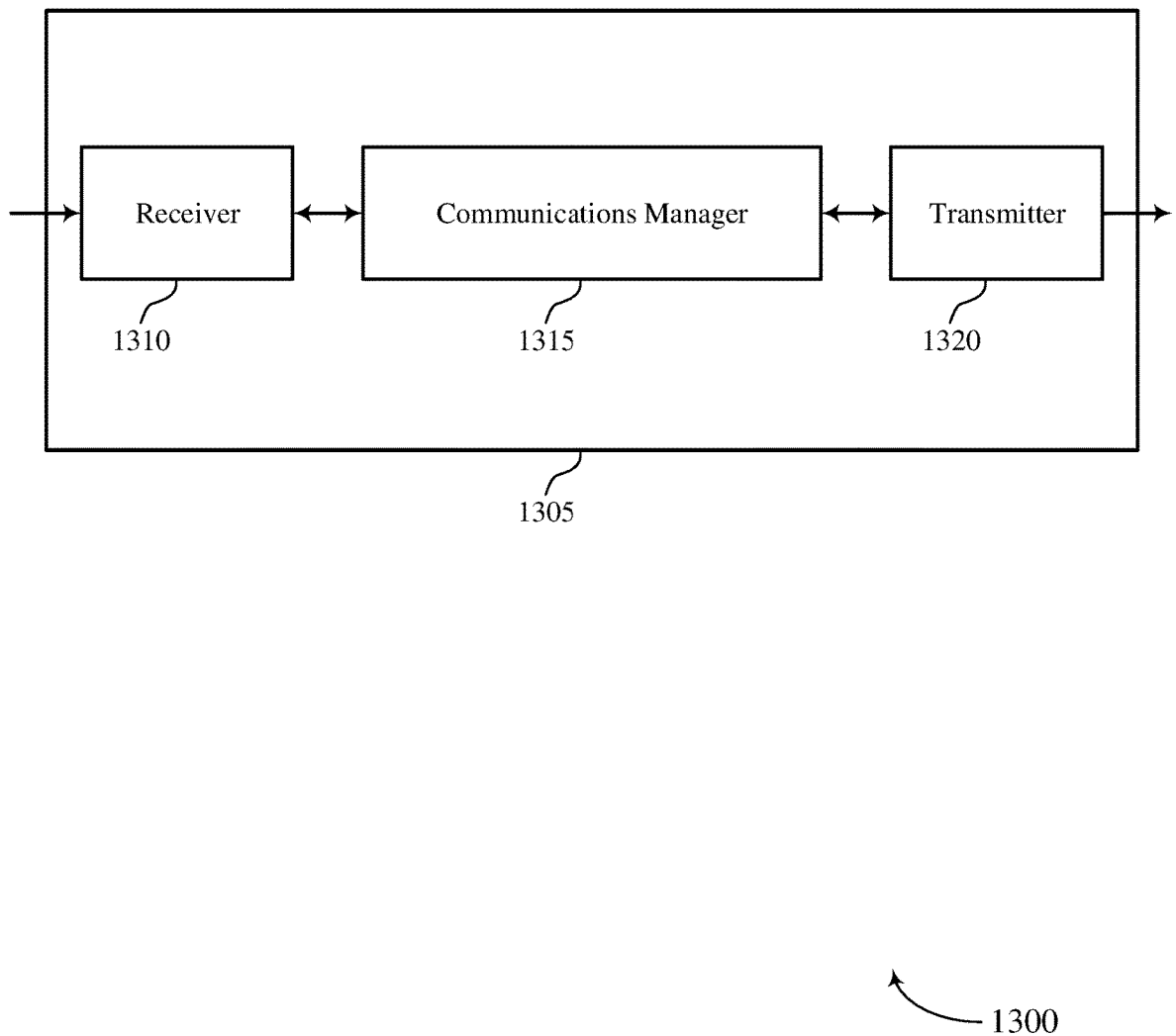
FIGS. 13 and 14 show block diagrams of devices that support processing enhancements for CSI reporting in accordance with aspects of the present disclosure.

FIG. 13 shows a block diagram 1300 of a device 1305 that supports processing enhancements for CSI reporting in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to processing enhancements for CSI reporting, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive, from a UE, a feedback reporting capability including a first feedback processing capability and a second feedback processing capability, configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receive, from the UE, a set of feedback reports associated with the set of feedback configurations. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
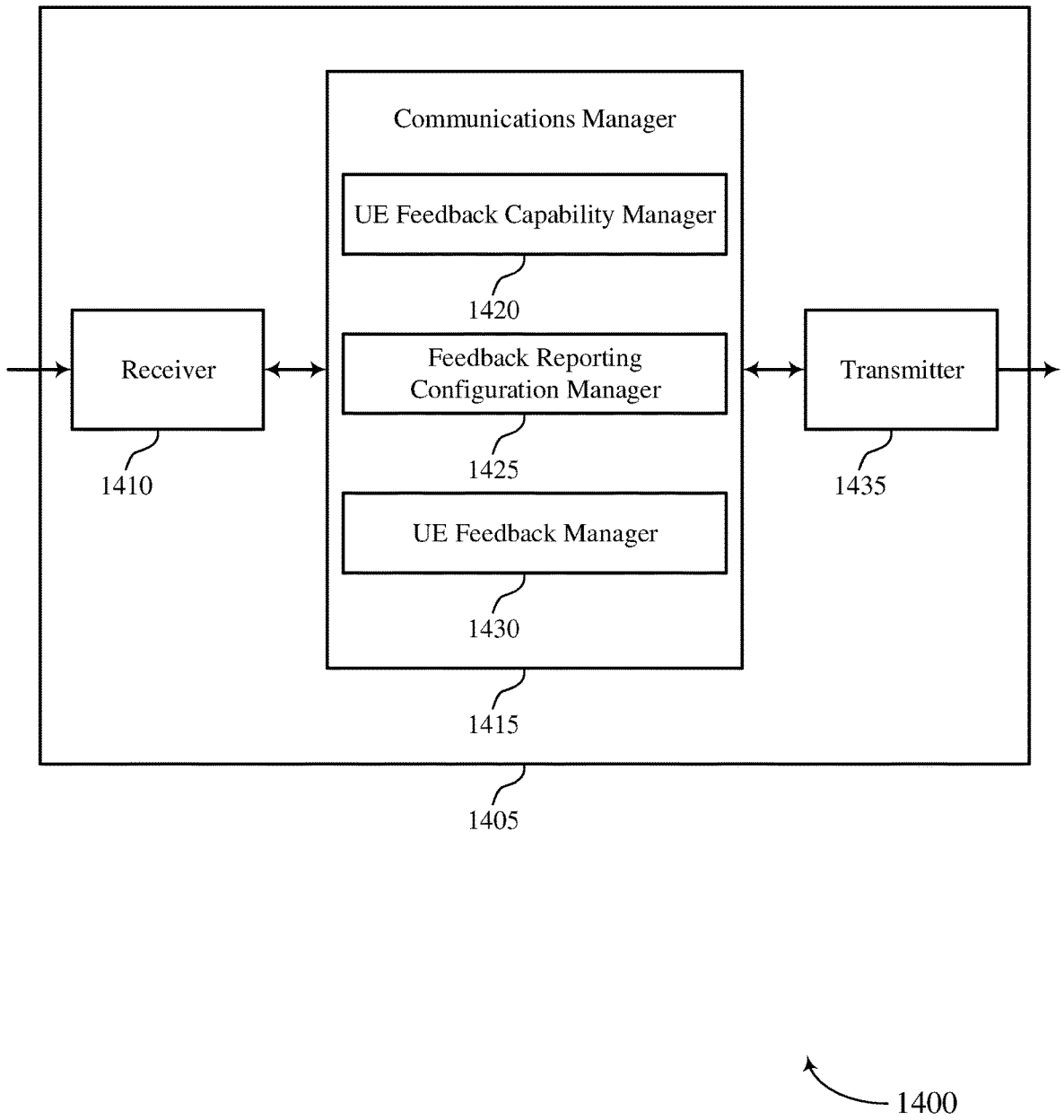

FIG. 14 shows a block diagram 1400 of a device 1405 that supports processing enhancements for CSI reporting in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to processing enhancements for CSI reporting, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include an UE feedback capability manager 1420, a feedback reporting configuration manager 1425, and an UE feedback manager 1430. The communications manager 1415 may be an example of aspects of the communications manager 1610 described herein.

The UE feedback capability manager 1420 may receive, from a UE, a feedback reporting capability including a first feedback processing capability and a second feedback processing capability. The feedback reporting configuration manager 1425 may configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability. The UE feedback manager 1430 may receive, from the UE, a set of feedback reports associated with the set of feedback configurations.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
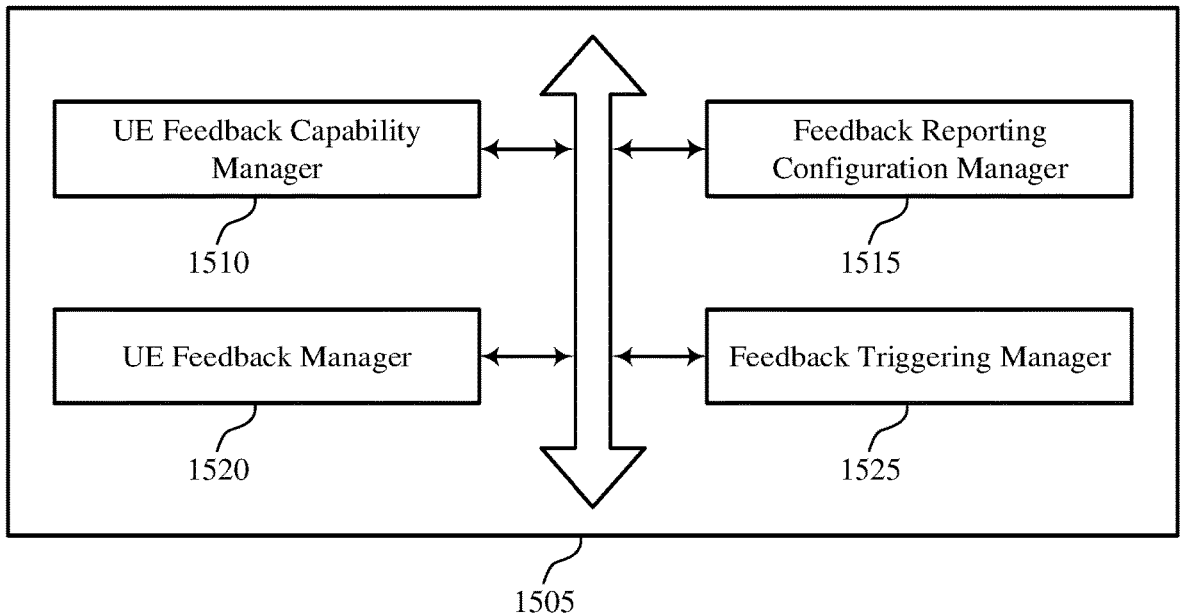
FIG. 15 shows a block diagram of a communications manager that supports processing enhancements for CSI reporting in accordance with aspects of the present disclosure.

FIG. 15 shows a block diagram 1500 of a communications manager 1505 that supports processing enhancements for CSI reporting in accordance with aspects of the present disclosure. The communications manager 1505 may be an example of aspects of a communications manager 1315, a communications manager 1415, or a communications manager 1610 described herein. The communications manager 1505 may include an UE feedback capability manager 1510, a feedback reporting configuration manager 1515, an UE feedback manager 1520, and a feedback triggering manager 1525. Each of these modules may communicate, directly or indirectly, with one another (e.g., via one or more buses).

The UE feedback capability manager 1510 may receive, from a UE, a feedback reporting capability including a first feedback processing capability and a second feedback processing capability. In some cases, the first feedback processing capability corresponds to a periodic feedback processing capability and the second feedback processing capability corresponds to an aperiodic feedback processing capability. In some cases, the first feedback processing capability corresponds to a processing capability associated with a first type of feedback and the second feedback processing capability corresponds to a processing capability associated with a second type of feedback. In some cases, the first type of feedback corresponds to channel state information reporting and the second type of feedback corresponds to beam reporting.

The feedback reporting configuration manager 1515 may configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability. In some examples, the feedback reporting configuration manager 1515 may configure periodicities and offsets for a set of periodic feedback processes for the UE such that processing associated with the set of periodic feedback processes does not exceed the periodic feedback processing capability.

In some examples, the feedback reporting configuration manager 1515 may configure parameters for a set of beam reporting feedback processes for the UE such that processing associated with the set of beam reporting feedback processes does not exceed the processing capability associated with beam reporting. The UE feedback manager 1520 may receive, from the UE, a set of feedback reports associated with the set of feedback configurations. The feedback triggering manager 1525 may transmit, to the UE, a first trigger for a first aperiodic reporting process. In some examples, the feedback triggering manager 1525 may transmit, to the UE, a second trigger for a second aperiodic reporting process, where transmitting the second trigger is based on a processing time for the first aperiodic reporting process and the aperiodic feedback processing capability.

Figure 16:
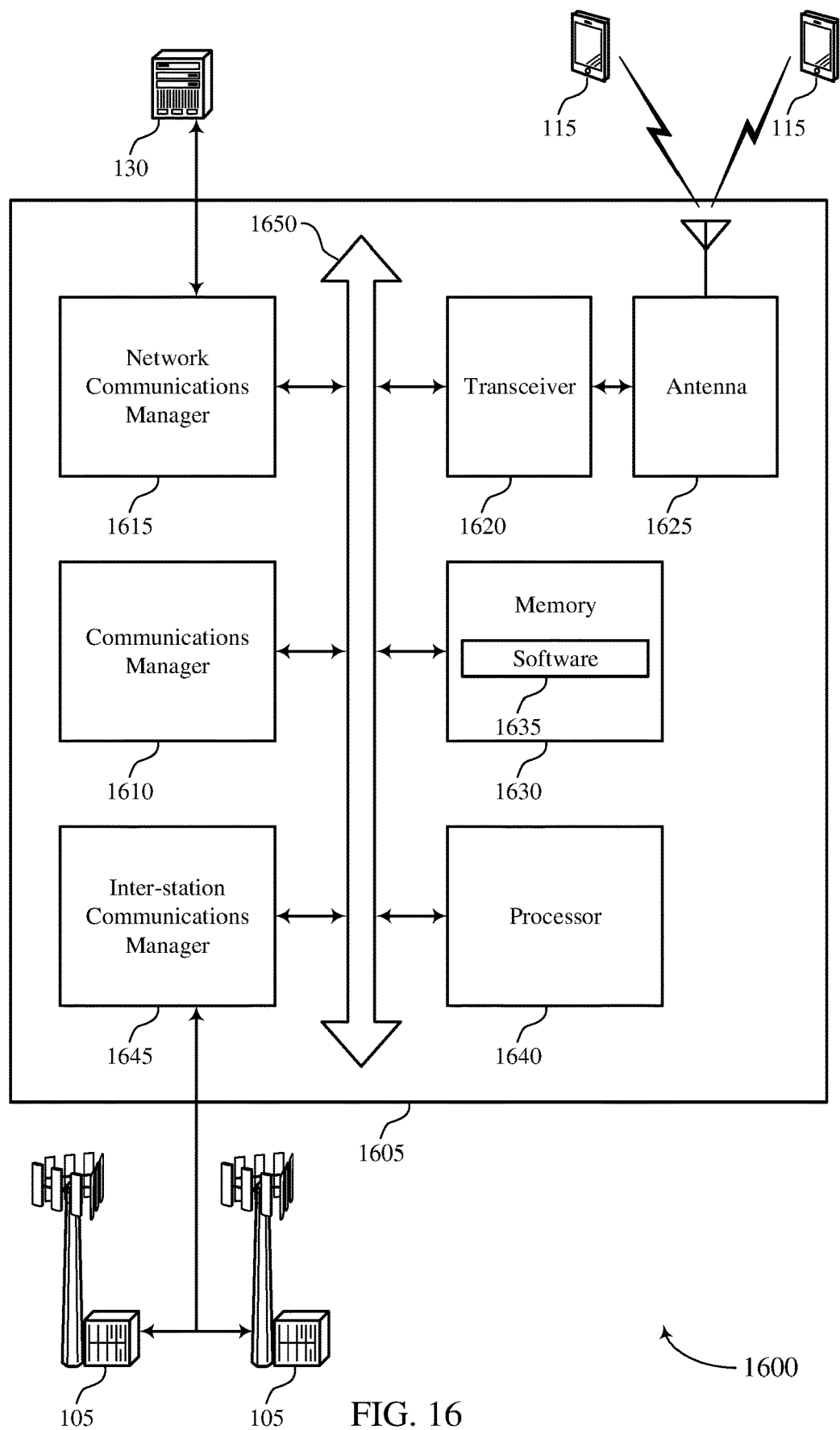
FIG. 16 shows a diagram of a system including a device that supports processing enhancements for CSI reporting in accordance with aspects of the present disclosure.

FIG. 16 shows a diagram of a system 1600 including a device 1605 that supports processing enhancements for CSI reporting in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may receive, from a UE, a feedback reporting capability including a first feedback processing capability and a second feedback processing capability, configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability, and receive, from the UE, a set of feedback reports associated with the set of feedback configurations.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code or software 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a central processing unit, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting processing enhancements for CSI reporting).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The software 1635 may include instructions to implement aspects of the present disclosure, including instructions to support wireless communications. The software 1635 may be stored in a non-transitory computer-readable medium such as system memory or other type of memory. In some cases, the software 1635 may not be directly executable by the processor 1640 but may cause a computer (e.g., when compiled and executed) to perform functions described herein.

Figure 17:
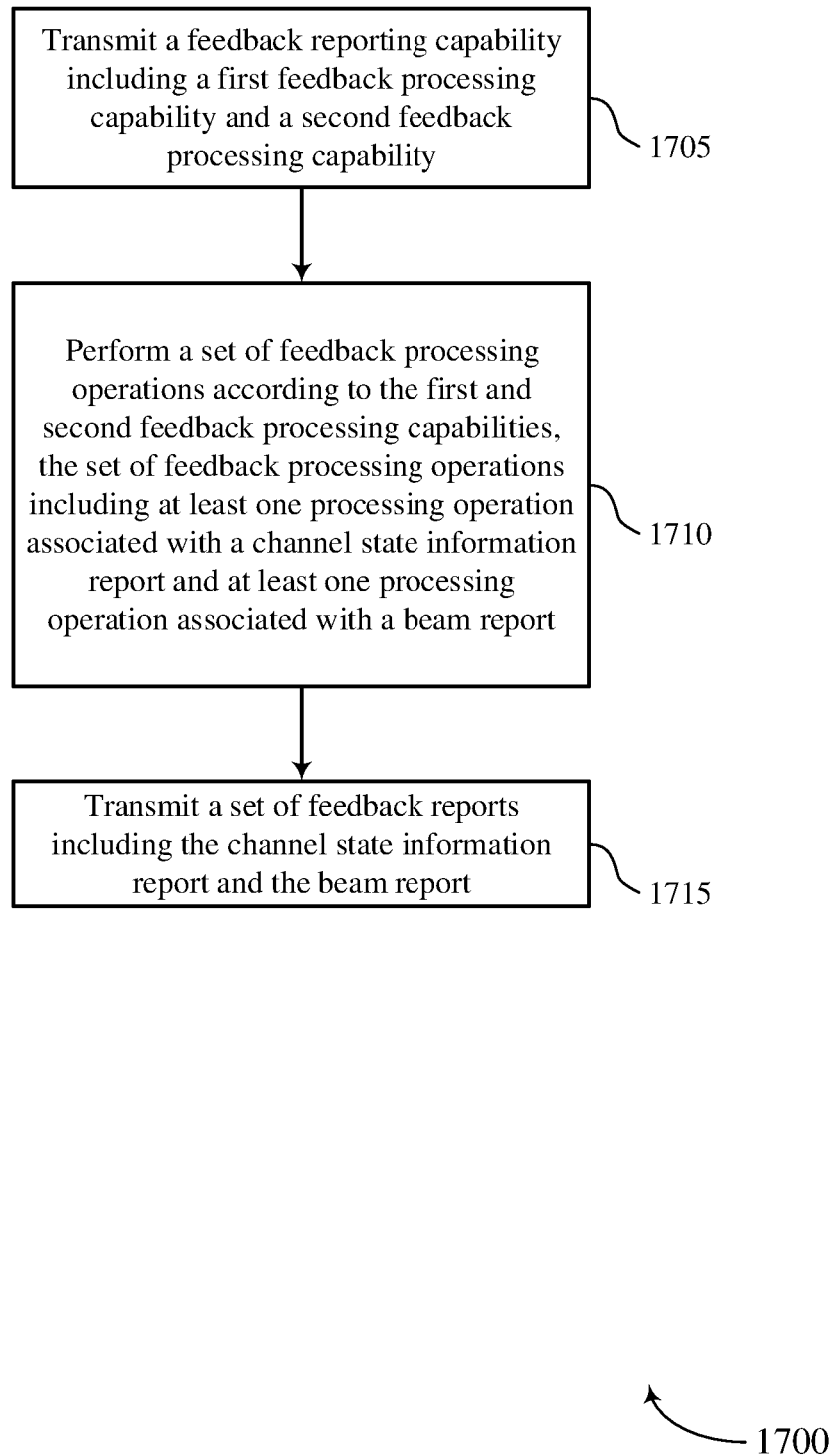
FIGS. 17 through 20 show flowcharts illustrating methods that support processing enhancements for CSI reporting in accordance with aspects of the present disclosure.

FIG. 17 shows a flowchart illustrating a method 1700 that supports processing enhancements for CSI reporting in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may transmit a feedback reporting capability including a first feedback processing capability and a second feedback processing capability. The operations of 1705 may be performed according to the methods described herein. In some examples, aspects of the operations of 1705 may be performed by a feedback capability manager as described with reference to FIGS. 9 through 12.

At 1710, the UE may perform a set of feedback processing operations according to the first and second feedback processing capabilities. The set of feedback processing operations may include at least one processing operation associated with a channel state information report and at least one processing operation associated with a beam report. For example, the UE may identifying time-frequency resources over which a CSI-RS is transmitted, and the UE may perform channel measurements (e.g., RSRP measurements, RSRQ measurements, SNIR measurements, etc.), perform CSI calculations (e.g., process channel measurements and perform calculations to convert channel measurements into CSI), etc. The operations of 1710 may be performed according to the methods described herein. In some examples, aspects of the operations of 1710 may be performed by a feedback processing manager as described with reference to FIGS. 9 through 12.

At 1715, the UE may transmit a set of feedback reports including the channel state information report and the beam report. The operations of 1715 may be performed according to the methods described herein. In some examples, aspects of the operations of 1715 may be performed by a feedback reporting manager as described with reference to FIGS. 9 through 12.

Figure 18:
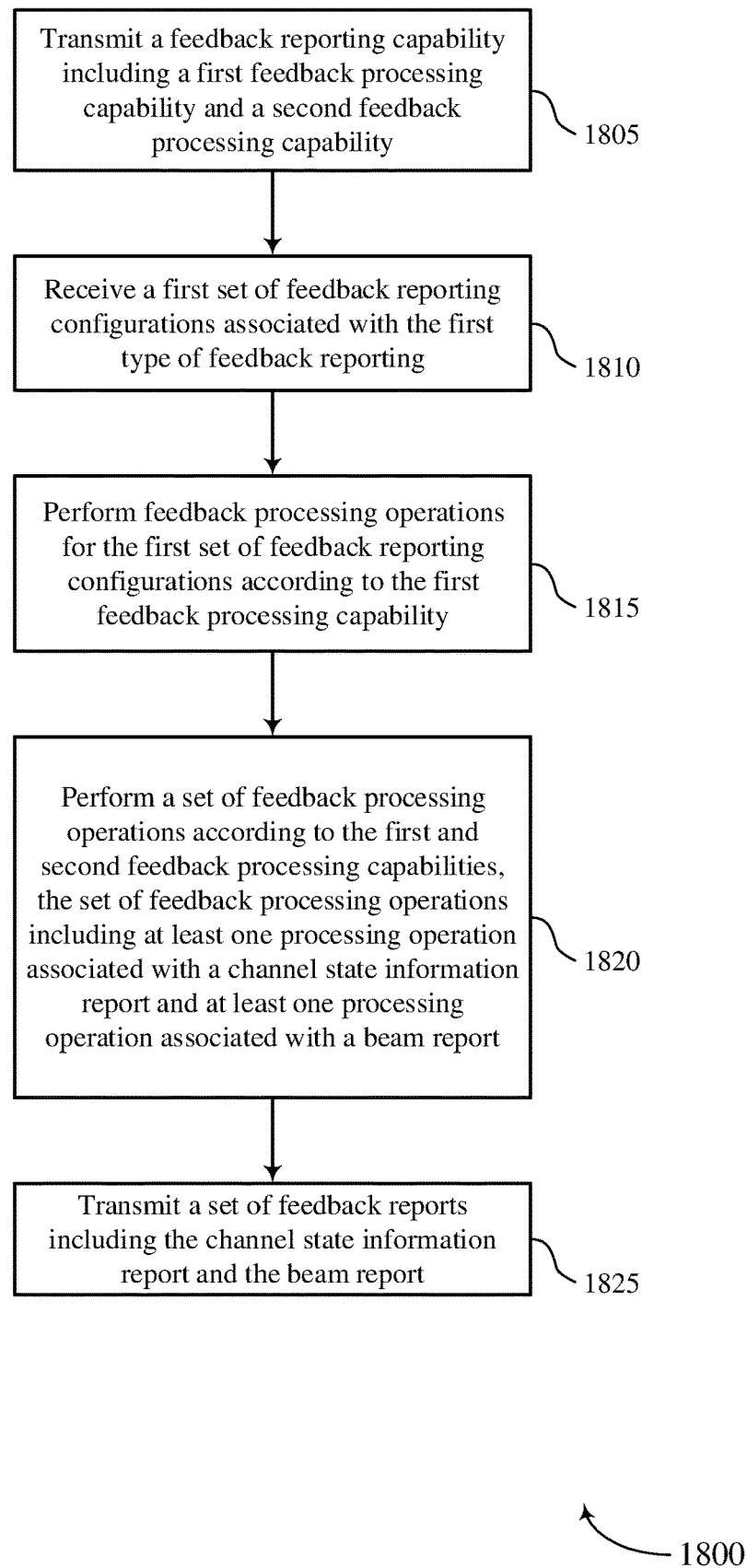

FIG. 18 shows a flowchart illustrating a method 1800 that supports processing enhancements for CSI reporting in accordance with aspects of the present disclosure. The operations of method 1800 may be implemented by a UE 115 or its components as described herein. For example, the operations of method 1800 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may transmit a feedback reporting capability including a first feedback processing capability and a second feedback processing capability. The operations of 1805 may be performed according to the methods described herein. In some examples, aspects of the operations of 1805 may be performed by a feedback capability manager as described with reference to FIGS. 9 through 12.

At 1810, the UE may receive a first set of feedback reporting configurations associated with the first type of feedback reporting. The operations of 1810 may be performed according to the methods described herein. In some examples, aspects of the operations of 1810 may be performed by a feedback reporting configuration manager as described with reference to FIGS. 9 through 12.

At 1815, the UE may perform feedback processing operations for the first set of feedback reporting configurations according to the first feedback processing capability. The operations of 1815 may be performed according to the methods described herein. In some examples, aspects of the operations of 1815 may be performed by a feedback processing manager as described with reference to FIGS. 9 through 12.

At 1820, the UE may perform a set of feedback processing operations according to the first and second feedback processing capabilities, the set of feedback processing operations including at least one processing operation associated with a channel state information report and at least one processing operation associated with a beam report. The operations of 1820 may be performed according to the methods described herein. In some examples, aspects of the operations of 1820 may be performed by a feedback processing manager as described with reference to FIGS. 9 through 12.

At 1825, the UE may transmit a set of feedback reports including the channel state information report and the beam report. The operations of 1825 may be performed according to the methods described herein. In some examples, aspects of the operations of 1825 may be performed by a feedback reporting manager as described with reference to FIGS. 9 through 12.

Figure 19:
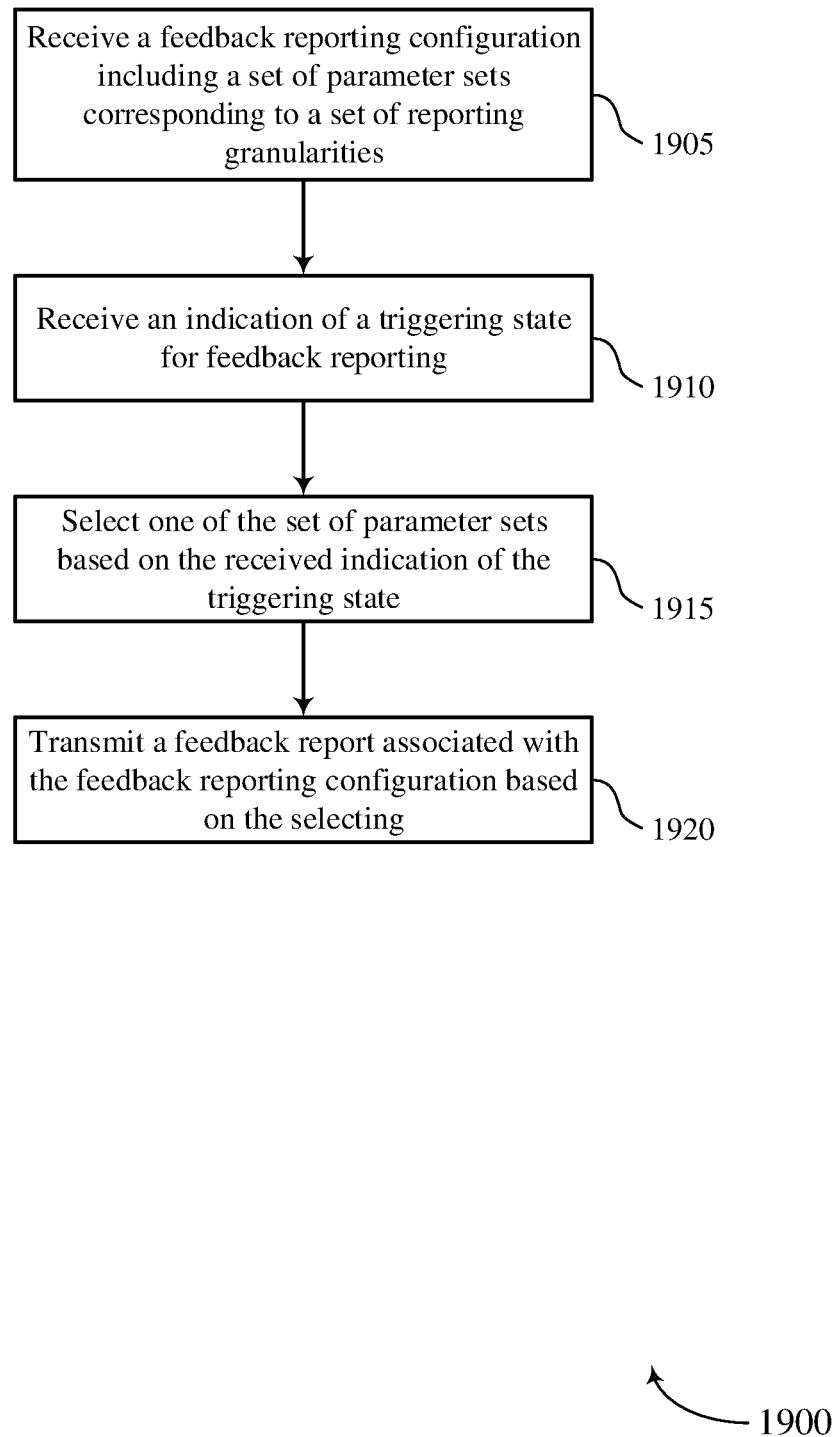

FIG. 19 shows a flowchart illustrating a method 1900 that supports processing enhancements for CSI reporting in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive a feedback reporting configuration including a set of parameter sets corresponding to a set of reporting granularities. The operations of 1905 may be performed according to the methods described herein. In some examples, aspects of the operations of 1905 may be performed by a feedback reporting configuration manager as described with reference to FIGS. 9 through 12.

At 1910, the UE may receive an indication of a triggering state for feedback reporting. The operations of 1910 may be performed according to the methods described herein. In some examples, aspects of the operations of 1910 may be performed by a feedback reporting configuration manager as described with reference to FIGS. 9 through 12.

At 1915, the UE may select one of the set of parameter sets based on the received indication of the triggering state. The operations of 1915 may be performed according to the methods described herein. In some examples, aspects of the operations of 1915 may be performed by a feedback reporting configuration manager as described with reference to FIGS. 9 through 12.

At 1920, the UE may transmit a feedback report associated with the feedback reporting configuration based on the selecting. The operations of 1920 may be performed according to the methods described herein. In some examples, aspects of the operations of 1920 may be performed by a feedback reporting manager as described with reference to FIGS. 9 through 12.

Figure 20:
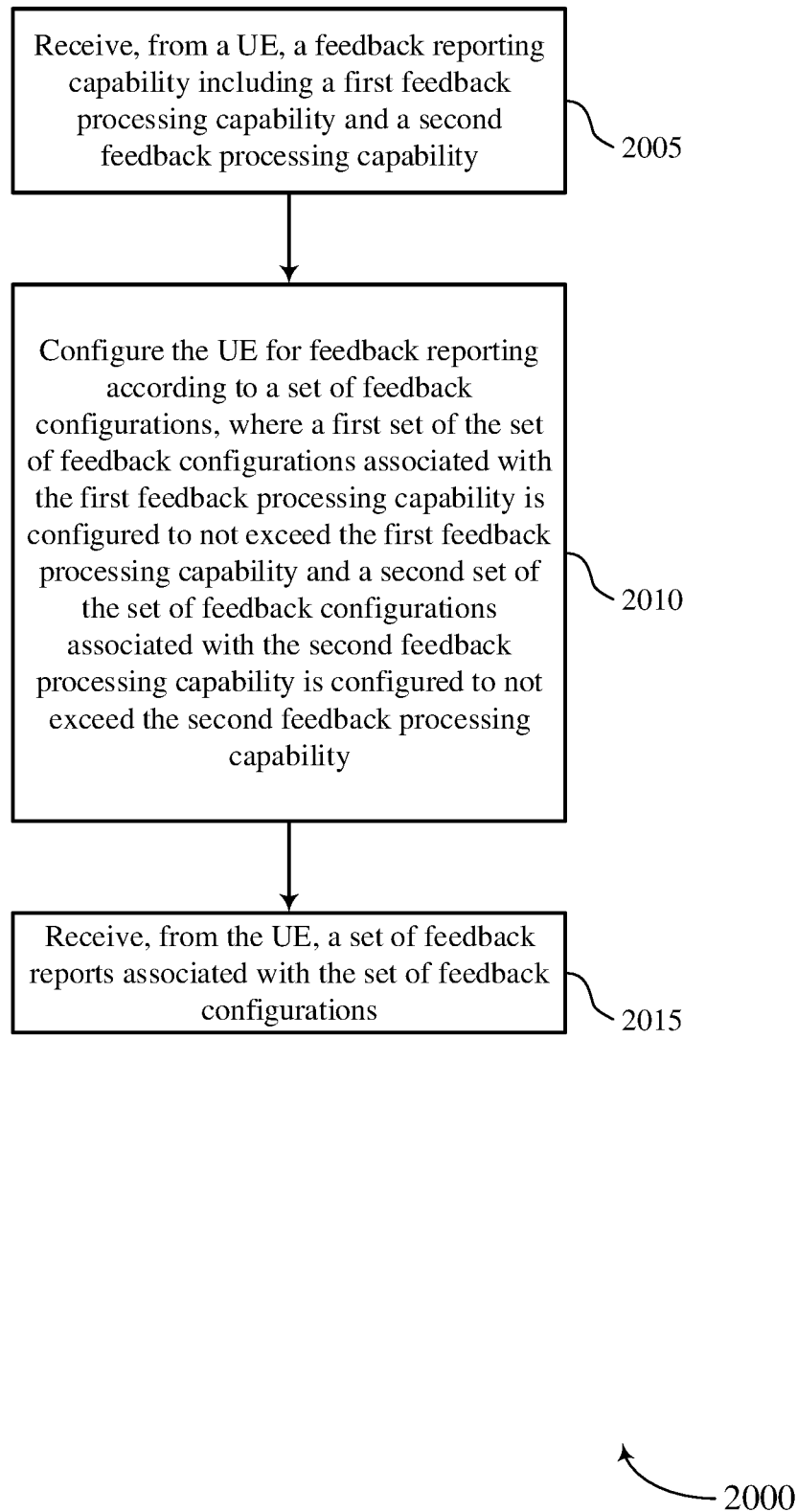

FIG. 20 shows a flowchart illustrating a method 2000 that supports processing enhancements for CSI reporting in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, a feedback reporting capability including a first feedback processing capability and a second feedback processing capability. The operations of 2005 may be performed according to the methods described herein. In some examples, aspects of the operations of 2005 may be performed by an UE feedback capability manager as described with reference to FIGS. 13 through 16.

At 2010, the base station may configure the UE for feedback reporting according to a set of feedback configurations, where a first set of the set of feedback configurations associated with the first feedback processing capability is configured to not exceed the first feedback processing capability and a second set of the set of feedback configurations associated with the second feedback processing capability is configured to not exceed the second feedback processing capability. The operations of 2010 may be performed according to the methods described herein. In some examples, aspects of the operations of 2010 may be performed by a feedback reporting configuration manager as described with reference to FIGS. 13 through 16.

At 2015, the base station may receive, from the UE, a set of feedback reports associated with the set of feedback configurations. The operations of 2015 may be performed according to the methods described herein. In some examples, aspects of the operations of 2015 may be performed by an UE feedback manager as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies.

While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a feedback reporting capability comprising a first feedback processing capability and a second feedback processing capability;
    performing a plurality of feedback processing operations according to the first and second feedback processing capabilities, the plurality of feedback processing operations comprising at least one processing operation associated with a channel state information report and at least one processing operation associated with a beam report; and
    transmitting a plurality of feedback reports comprising the channel state information report and the beam report.

2. The method of claim 1, wherein the first feedback processing capability is associated with a first type of feedback reporting and the second feedback processing capability is associated with a second type of feedback reporting, the method further comprising:
    receiving a first plurality of feedback reporting configurations associated with the first type of feedback reporting; and
    performing feedback processing operations for the first plurality of feedback reporting configurations according to the first feedback processing capability.

3. The method of claim 2, further comprising:
    determining a processing conflict between two or more of the feedback processing operations associated with the first plurality of feedback reporting configurations; and
    suppressing at least one of the two or more of the feedback processing operations based at least in part on the determined processing conflict and at least one of priorities or timing of the two or more of the feedback processing operations.

4. The method of claim 2, further comprising:
    receiving a second plurality of feedback reporting configurations associated with the second type of feedback reporting; and
    performing feedback processing operations for the second plurality of feedback reporting configurations according to the second feedback processing capability and independently of the first feedback processing capability.

5. The method of claim 2, wherein the first type of feedback corresponds to one of periodic or aperiodic feedback reporting and the second type of feedback corresponds to the other of periodic or aperiodic feedback reporting.

6. The method of claim 2, wherein the first type of feedback corresponds to channel state information reporting and the second type of feedback corresponds to beam reporting.

7. An apparatus for wireless communication, comprising:
    one or more processors;
    one or more memories coupled with the one or more processors; and
    instructions stored in the one or more memories and executable by the one or more processors to cause the apparatus to:
        transmit a feedback reporting capability comprising a first feedback processing capability and a second feedback processing capability;
        perform a plurality of feedback processing operations according to the first and second feedback processing capabilities, the plurality of feedback processing operations comprising at least one processing operation associated with a channel state information report and at least one processing operation associated with a beam report; and
        transmit a plurality of feedback reports comprising the channel state information report and the beam report.

8. The apparatus of claim 7, wherein the first feedback processing capability is associated with a first type of feedback reporting and the second feedback processing capability is associated with a second type of feedback reporting, and the instructions are further executable by the one or more processors to cause the apparatus to:
    receive a first plurality of feedback reporting configurations associated with the first type of feedback reporting; and
    perform feedback processing operations for the first plurality of feedback reporting configurations according to the first feedback processing capability.

9. The apparatus of claim 8, wherein the instructions are further executable by the one or more processors to cause the apparatus to:
    determine a processing conflict between two or more of the feedback processing operations associated with the first plurality of feedback reporting configurations; and
    suppress at least one of the two or more of the feedback processing operations based at least in part on the determined processing conflict and at least one of priorities or timing of the two or more of the feedback processing operations.

10. The apparatus of claim 8, wherein the instructions are further executable by the one or more processors to cause the apparatus to:
    receive a second plurality of feedback reporting configurations associated with the second type of feedback reporting; and
    perform feedback processing operations for the second plurality of feedback reporting configurations according to the second feedback processing capability and independently of the first feedback processing capability.

11. The apparatus of claim 8, wherein the first type of feedback corresponds to one of periodic or aperiodic feedback reporting and the second type of feedback corresponds to the other of periodic or aperiodic feedback reporting.

12. The apparatus of claim 8, wherein the first type of feedback corresponds to channel state information reporting and the second type of feedback corresponds to beam reporting.

13. An apparatus for wireless communication, comprising:
    means for transmitting a feedback reporting capability comprising a first feedback processing capability and a second feedback processing capability;
    means for performing a plurality of feedback processing operations according to the first and second feedback processing capabilities, the plurality of feedback processing operations comprising at least one processing operation associated with a channel state information report and at least one processing operation associated with a beam report; and means for transmitting a plurality of feedback reports comprising the channel state information report and the beam report.

14. The apparatus of claim 13, wherein the first feedback processing capability is associated with a first type of feedback reporting and the second feedback processing capability is associated with a second type of feedback reporting, the apparatus further comprising:

means for receiving a first plurality of feedback reporting configurations associated with the first type of feedback reporting; and means for performing feedback processing operations for the first plurality of feedback reporting configurations according to the first feedback processing capability.

15. The apparatus of claim 14, further comprising:

means for determining a processing conflict between two or more of the feedback processing operations associated with the first plurality of feedback reporting configurations; and means for suppressing at least one of the two or more of the feedback processing operations based at least in part on the determined processing conflict and at least one of priorities or timing of the two or more of the feedback processing operations.

16. The apparatus of claim 14, further comprising:

means for receiving a second plurality of feedback reporting configurations associated with the second type of feedback reporting; and means for performing feedback processing operations for the second plurality of feedback reporting configurations according to the second feedback processing capability and independently of the first feedback processing capability.

17. The apparatus of claim 14, wherein the first type of feedback corresponds to one of periodic or aperiodic feedback reporting and the second type of feedback corresponds to the other of periodic or aperiodic feedback reporting.

18. The apparatus of claim 14, wherein the first type of feedback corresponds to channel state information reporting and the second type of feedback corresponds to beam reporting.

19. A non-transitory computer-readable medium storing code for wireless communication, the code comprising instructions executable by one or more processors to:

transmit a feedback reporting capability comprising a first feedback processing capability and a second feedback processing capability;

perform a plurality of feedback processing operations according to the first and second feedback processing capabilities, the plurality of feedback processing operations comprising at least one processing operation associated with a channel state information report and at least one processing operation associated with a beam report; and transmit a plurality of feedback reports comprising the channel state information report and the beam report.

20. The non-transitory computer-readable medium of claim 19, wherein the first feedback processing capability is associated with a first type of feedback reporting and the second feedback processing capability is associated with a second type of feedback reporting, and the instructions are executable to:

receive a first plurality of feedback reporting configurations associated with the first type of feedback reporting; and perform feedback processing operations for the first plurality of feedback reporting configurations according to the first feedback processing capability.

21. The non-transitory computer-readable medium of claim 20, wherein the instructions are further executable to:

determine a processing conflict between two or more of the feedback processing operations associated with the first plurality of feedback reporting configurations; and suppress at least one of the two or more of the feedback processing operations based at least in part on the determined processing conflict and at least one of priorities or timing of the two or more of the feedback processing operations.

22. The non-transitory computer-readable medium of claim 20, wherein the instructions are further executable to:

receive a second plurality of feedback reporting configurations associated with the second type of feedback reporting; and perform feedback processing operations for the second plurality of feedback reporting configurations according to the second feedback processing capability and independently of the first feedback processing capability.

23. The non-transitory computer-readable medium of claim 20, wherein the first type of feedback corresponds to one of periodic or aperiodic feedback reporting and the second type of feedback corresponds to the other of periodic or aperiodic feedback reporting.

24. The non-transitory computer-readable medium of claim 20, wherein the first type of feedback corresponds to channel state information reporting and the second type of feedback corresponds to beam reporting.

* * * * *